(12) United States Patent
Uchino et al.

(10) Patent No.: US 12,223,137 B2
(45) Date of Patent: Feb. 11, 2025

(54) ELECTRONIC DEVICE

(71) Applicant: Samsung Display Co., Ltd., Yongin-si (KR)

(72) Inventors: Satoshi Uchino, Yokohama (JP); Kazuhiro Matsumoto, Yokohama (JP); Masahiko Takiguchi, Yokohama (JP)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/107,635

(22) Filed: Feb. 9, 2023

(65) Prior Publication Data

US 2023/0325028 A1    Oct. 12, 2023

(30) Foreign Application Priority Data

Apr. 6, 2022 (KR) .................. 10-2022-0042860

(51) Int. Cl.
*G06F 3/041* (2006.01)
*G06F 3/044* (2006.01)

(52) U.S. Cl.
CPC ........ *G06F 3/04166* (2019.05); *G06F 3/0418* (2013.01); *G06F 3/0443* (2019.05); *G06F 2203/04102* (2013.01)

(58) Field of Classification Search
None
See application file for complete search history.

(56) References Cited

U.S. PATENT DOCUMENTS

| | | | |
|---|---|---|---|
| 4,875,048 A | 10/1989 | Shimizu et al. | |
| 5,121,119 A | 6/1992 | Higuchi et al. | |
| 8,664,548 B2 | 3/2014 | Wilson et al. | |
| 9,069,425 B2 | 6/2015 | Shin et al. | |
| 2018/0329555 A1* | 11/2018 | Kim | G09G 3/3208 |
| 2019/0034027 A1* | 1/2019 | Bohannon | G06F 3/0418 |

FOREIGN PATENT DOCUMENTS

| | | |
|---|---|---|
| JP | H01185025 A | 7/1989 |
| JP | H03205921 A | 9/1991 |
| JP | 2690905 B2 | 12/1997 |
| JP | 2009294197 A | 12/2009 |
| KR | 1020130078937 A | 7/2013 |
| KR | 101420512 B1 | 7/2014 |
| KR | 101996084 B1 | 7/2019 |
| KR | 1020190076327 A | 7/2019 |

\* cited by examiner

*Primary Examiner* — Ifedayo B Iluyomade
(74) *Attorney, Agent, or Firm* — CANTOR COLBURN LLP

(57) ABSTRACT

An electronic device includes a display panel, a sensor layer disposed on the display panel and including a plurality of sensing electrodes, and a sensor driver connected with the plurality of sensing electrodes to drive the sensor layer. The sensor driver includes a plurality of analog-to-digital converters that samples an input signal received from the outside by the sensor layer. The plurality of analog-to-digital converters is connected one-to-one with the plurality of sensing electrodes.

17 Claims, 19 Drawing Sheets

ELECTRONIC DEVICE

This application claims priority to Korean Patent Application No. 10-2022-0042860, filed on Apr. 6, 2022, and all the benefits accruing therefrom under 35 U.S.C. § 119, the content of which in its entirety is herein incorporated by reference.

BACKGROUND

1. Field

Embodiments of the disclosure described herein relate to an electronic device, and more particularly, relate to an electronic device with improved sensor performance.

2. Description of the Related Art

Each of multimedia electronic devices such as televisions, mobile phones, tablet computers, navigation systems, game consoles, and the like includes an electronic device for displaying an image. Each of the electronic devices may include an input sensor capable of providing a touch-based input scheme which allows a user to easily enter information or commands intuitively and conveniently, other than a general input scheme such as a button, a keyboard, a mouse, or the like.

The input sensor may be included in the electronic device to sense a touch position by an external input.

SUMMARY

Embodiments of the disclosure provide an electronic device for reducing noise to have improved sensing performance.

Embodiments of the disclosure provide an electronic device for simultaneously connecting sensing electrodes of an input sensor with a plurality of analog-to-digital converters to sufficiently ensure a sampling time and increase an input signal.

In an embodiment of the disclosure, an electronic device may include a display panel, a sensor layer disposed on the display panel and including a plurality of sensing electrodes, and a sensor driver connected with the plurality of sensing electrodes to drive the sensor layer. The sensor driver may include a plurality of analog-to-digital converters that sample an input signal received from an outside by the sensor layer. The plurality of analog-to-digital converters may be connected one-to-one with the plurality of sensing electrodes.

In an embodiment, a number of the plurality of sensing electrodes may be equal to a number of a number of the plurality of analog-to-digital converters.

In an embodiment, the plurality of sensing electrodes may be sampled at a same time by the plurality of analog-to-digital converters respectively connected with the plurality of sensing electrodes.

In an embodiment, the electronic device may further include a plurality of switches respectively connected between the plurality of sensing electrodes and the plurality of analog-to-digital converters. The plurality of sensing electrodes may be selectively electrically connected with the plurality of analog-to-digital converters through the plurality of switches.

In an embodiment, the plurality of sensing electrodes may include a plurality of first sensing electrodes extending in a first direction and a plurality of second sensing electrodes extending in a second direction crossing the first direction.

In an embodiment, the plurality of analog-to-digital converters may include a plurality of first analog-to-digital converters respectively connected with the plurality of first sensing electrodes and a plurality of second analog-to-digital converters respectively connected with the plurality of second sensing electrodes.

In an embodiment, a number of the plurality of first analog-to-digital converters may be equal to a number of the plurality of first sensing electrodes. A number of the plurality of second analog-to-digital converters may be equal to a number of the plurality of second sensing electrodes.

In an embodiment, sensing electrodes which are connected with the plurality of analog-to-digital converters among the plurality of sensing electrodes and sensing electrodes which are not connected with the plurality of analog-to-digital converters among the plurality of sensing electrodes may be alternately arranged.

In an embodiment, the plurality of analog-to-digital converters may be connected one-to-one with some sensing electrodes to which the input signal is applied among the plurality of sensing electrodes.

In an embodiment, the electronic device may further include a processor that receives a plurality of sampling result values from the sensor driver. The processor may calculate an output range of the plurality of sampling result values and a correction value based on the plurality of sampling result values.

In an embodiment, the processor may accumulate the received sampling result values to calculate the output range and may determine a predetermined sampling result value deviating from the output range among the accumulated sampling result values as noise.

In an embodiment, the processor may replace the predetermined sampling result value determined as the noise with an immediately previous sampling result value to calculate the correction value.

In an embodiment, the output range may be determined based on a maximum value and a minimum value of the plurality of sampling result values or an average value or a mode of the plurality of sampling result values.

In an embodiment, the electronic device may further include a main driver connected with the sensor driver. The processor may be disposed in any one of the sensor driver or the main driver.

In an embodiment, an electronic device may include a display panel, a sensor layer disposed on the display panel and including a plurality of sensing electrodes, and a sensor driver connected with the plurality of sensing electrodes to drive the sensor layer. The sensor driver may include a plurality of analog-to-digital converters that samples an input signal received from an outside by the sensor layer. One of the plurality of analog-to-digital converters may be electrically connected with a sensing electrode group including some sensing electrodes adjacent to each other among the plurality of sensing electrodes.

In an embodiment, the sensing electrode group may be plural in number. A plurality of sensing electrode groups may be sampled at a same time by analog-to-digital converters respectively connected with the plurality of sensing electrode groups.

In an embodiment of the disclosure, an electronic device may include a display panel, a sensor layer disposed on the display panel and including a plurality of sensing electrodes extending in a first direction and arranged in a second direction crossing the first direction, and a sensor driver electrically connected with the plurality of sensing electrodes to drive the sensor layer. The sensor driver may include a plurality of analog-to-digital converters connected one-to-one with the plurality of sensing electrodes to sample an input signal received in the plurality of sensing electrodes from the outside at a same time. A number of the plurality of sensing electrodes may be equal to a number of the plurality of analog-to-digital converters.

In an embodiment, the sensor driver may further include a processor that receives a plurality of sampling result values. The processor may calculate an output range based on the plurality of sampling result values and may calculate a correction value for predetermined sampling result values deviating from the output range.

In an embodiment, the correction value may correspond to a sampling result value received immediately before each of the predetermined sampling result values.

In an embodiment, the output range may be determined based on a maximum value and a minimum value of the plurality of sampling result values or an average value or a mode of the plurality of sampling result values.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1A:
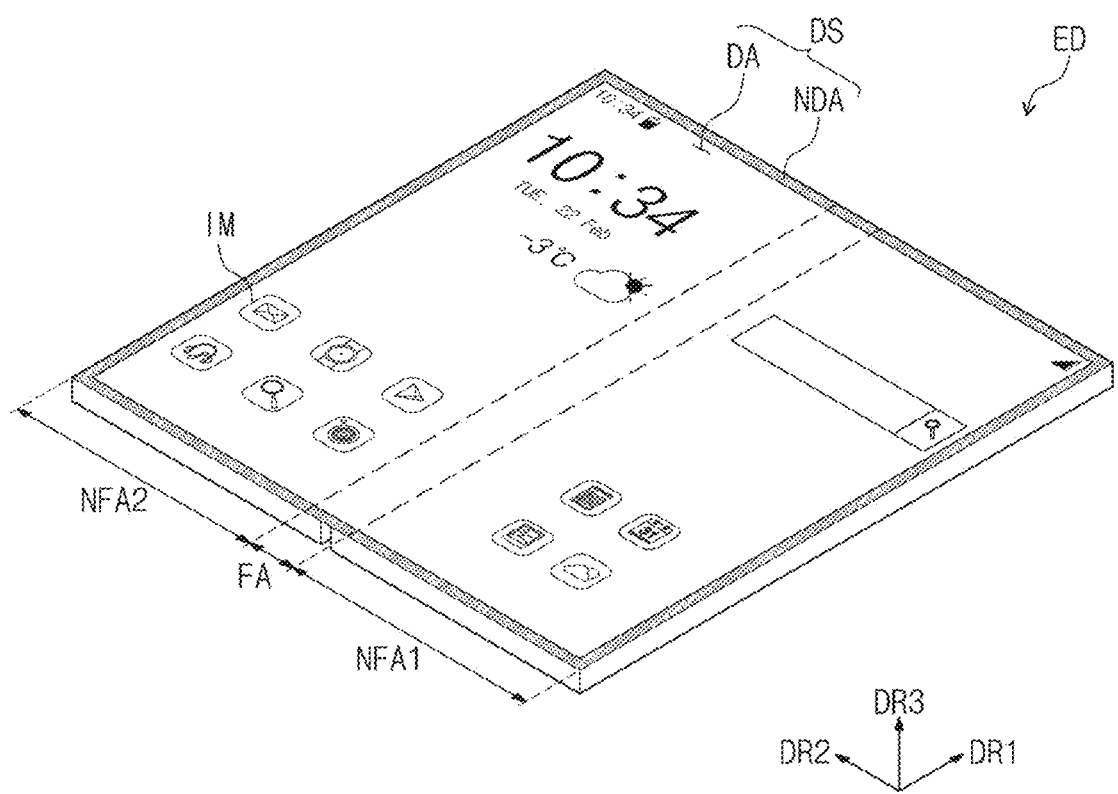
FIGS. 1A and 1B are perspective views of an embodiment of an electronic device according to the disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in the drawings, the thicknesses, the ratios, and the dimensions of the components may be exaggerated for effective description of technical contents. The expression "and/or" includes one or more combinations capable of being defined by associated components.

Although the terms "first," "second," etc. may be used herein in describing various components, such components should not be construed as being limited by these terms. These terms are only used to distinguish one component from another component. A first component could be termed a second component without departing from the scope of the claims of the disclosure, and similarly a second component could be termed a first component, for example. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, components, parts, or a combination thereof, but do not preclude the presence or addition of one or more other features, numbers, steps, operations, components, parts, or a combination thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to the accompanying drawings.

Figure 1B:
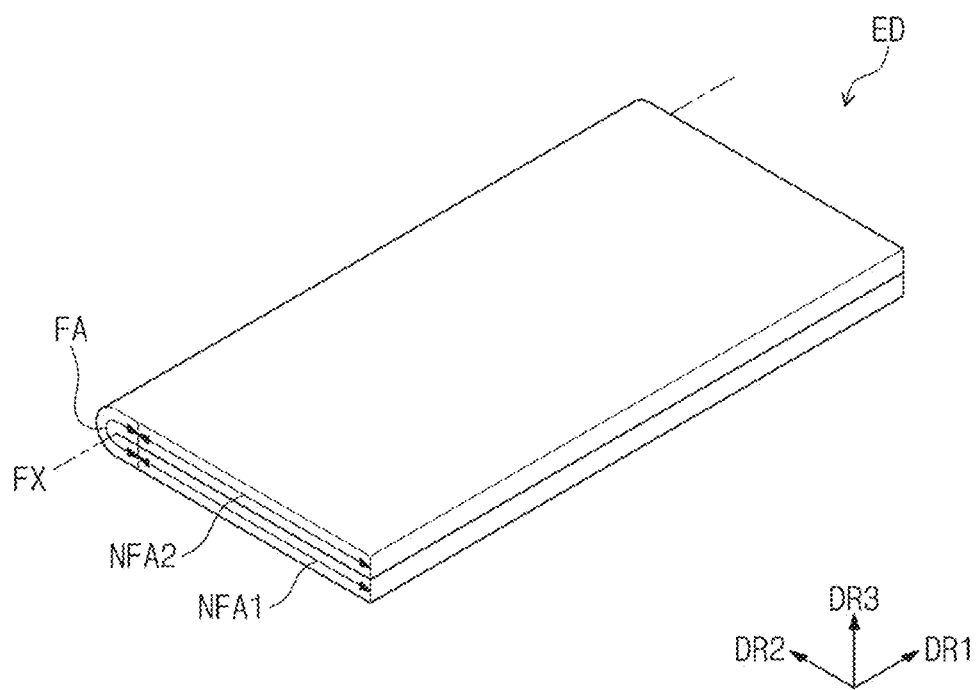

FIGS. 1A and 1B are perspective views of an embodiment of an electronic device ED according to the disclosure. FIG. 1A illustrates an unfolded state (or an unfolding state) of the electronic device ED. FIG. 1B illustrates a folding state of the electronic device ED.

Referring to FIGS. 1A and 1B, the electronic device ED may be a device which is activated according to an electrical signal. In an embodiment, the electronic device ED may be, but is not limited to, a mobile phone, a foldable mobile phone, a tablet, a car navigation system, a game console, or a wearable device, for example. It is illustratively shown in FIGS. 1A and 1B that the electronic device ED is the foldable mobile phone, but not particularly limited thereto.

The electronic device ED in an embodiment of the disclosure may include a display surface DS in which a first direction DR1 and a second direction DR2 crossing the first direction DR1 are defined. The electronic device ED may provide a user with an image IM through the display surface DS.

The display surface DS may include a display area DA and a non-display area NDA around the display area DA.

The display area DA may display the image IM, and the non-display area NDA may not display the image IM. The non-display area NDA may surround the display area DA. However, the disclosure is not limited thereto. The display area DA and the non-display area NDA may be deformed in shape.

Hereinafter, a direction substantially perpendicularly crossing a plane defined by the first direction DR1 and the second direction DR2 is defined as a third direction DR3. Furthermore, in the specification, "in a plan view" may be defined as a "state viewed from the third direction DR3".

The electronic device ED may include a folding area FA (or a foldable area) and a plurality of non-folding areas NFA1 and NFA2. The non-folding area NFA1 and NFA2 may include the first non-folding area NFA1 and the second non-folding area NFA2. The folding area FA may be disposed between the first non-folding area NFA1 and the second non-folding area NFA2. The first non-folding area NFA1, the folding area FA, and the second non-folding area NFA2 may be sequentially defined along the second direction DR2 in the electronic device ED.

As illustrated in FIG. 1B, the folding area FA may be folded about a folding axis FX parallel to the first direction DR1. The folding area FA may extend along the first direction DR1. The folding area FA may be folded to have a predetermined curvature and a predetermined curvature radius. The first non-folding area NFA1 and the second non-folding area NFA2 may face each other, and the electronic device ED may be inner-folded such that the display surface DS is not exposed to the outside.

In an embodiment of the disclosure, the electronic device ED may be out-folded such that the display surface DS is exposed to the outside. In an embodiment of the disclosure, the electronic device ED may be configured such that the inner-folding operation or the outer-folding operation is repeated mutually from the unfolding operation, but not limited thereto. In an embodiment of the disclosure, the electronic device ED may select any one of the unfolding operation, the inner-folding operation, and the outer-folding operation.

The foldable electronic device ED is described as an embodiment in FIGS. 1A and 1B, but the disclosure is not limited thereto. In an embodiment, the electronic device ED may be changed to various electronic devices such as a rigid electronic device, e.g., an electronic device in which the folding area FA is not defined, a rollable electronic device, or a slidable electronic device, for example.

Figure 2:
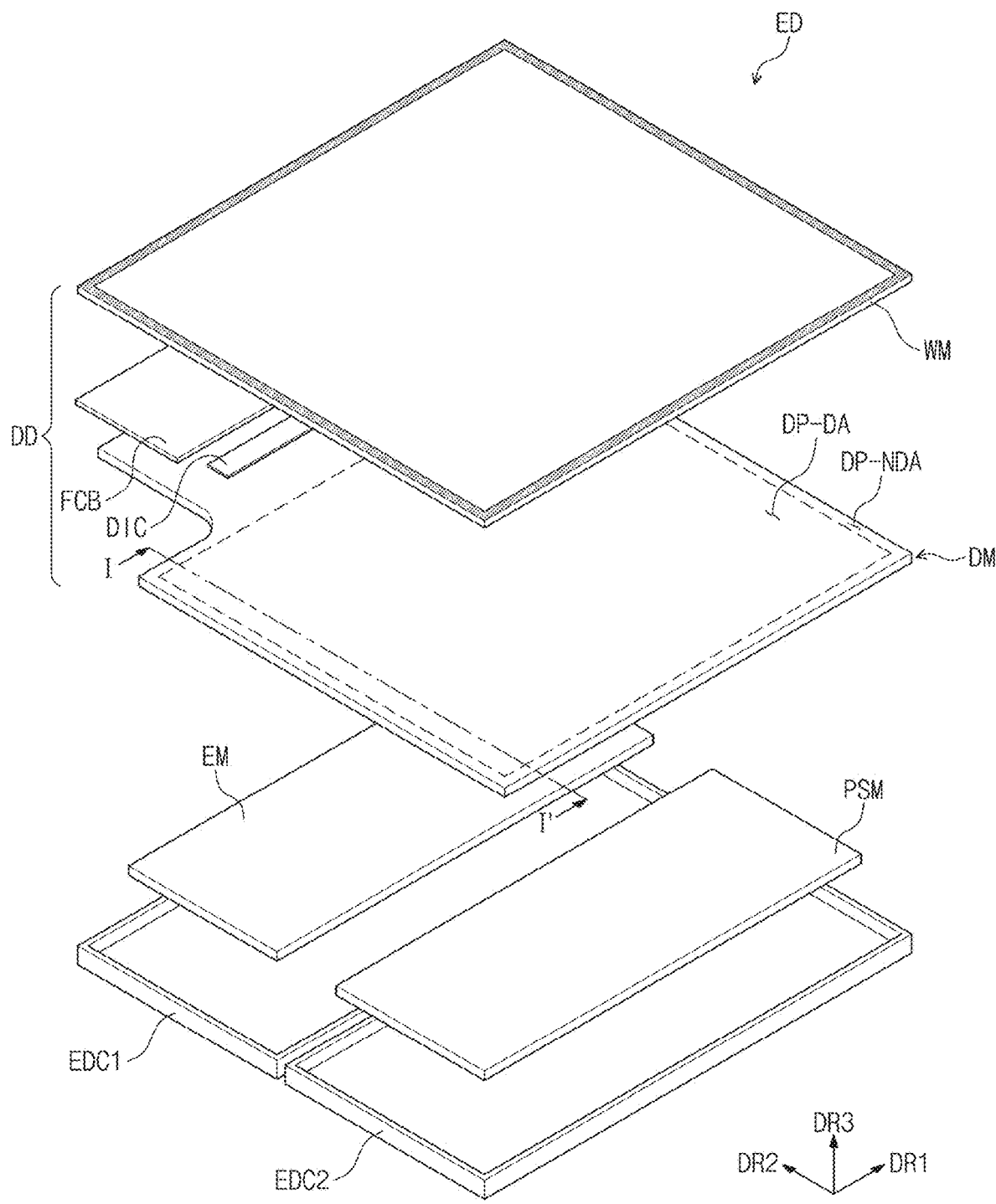
FIG. 2 is an exploded perspective view of an electronic device according to the disclosure.

FIG. 2 is an exploded perspective view of an embodiment of an electronic device according to the disclosure.

Referring to FIG. 2, an electronic device ED may include a display device DD, an electronic module EM, a power module PSM, and cases EDC1 and EDC2. Although not separately illustrated, the electronic device ED may further include a mechanism structure for controlling a folding operation of the display device DD.

The display device DD may generate an image and may detect an external input. The display device DD may include a window module WM and a display module DM. The window module WM may provide a front surface of the electronic device ED.

The display module DM may be a laminated structure in which a plurality of components is laminated. A detailed description of the laminated structure of the display module DM will be given below.

The display module DM may include a display area DP-DA and a non-display area DP-NDA respectively corresponding to a display area DA (refer to FIG. 1A) and a non-display area NDA (refer to FIG. 1A) of the electronic device ED. In the specification, that "an area/portion and an area/portion correspond to each other" means that "the area/portion and the area/portion overlap with each other" and is not limited to the same area. The display module DM may include a driving chip DIC disposed on the non-display area DP-NDA. The display module DM may further include a flexible circuit board FCB coupled to the non-display area DP-NDA.

The driving chip DIC may include driving elements for driving a pixel of the display panel DP, e.g., a data driving circuit. A structure in which the driving chip DIC is disposed (e.g., mounted) on the display module DM is illustrated in FIG. 2, but the disclosure is not limited thereto. In an embodiment, the driving chip DIC may be disposed (e.g., mounted) on the flexible circuit board FCB, for example.

The electronic module EM may at least include a main driver. The electronic module EM may include a wireless communication module, a camera module, a proximity sensor module, an image input module, a sound input module, a sound output module, a memory, an external interface module, or the like. The electronic module EM may be electrically connected with the power module PSM.

The main driver (or a main controller) may control the overall operation of the electronic device ED. In an embodiment, the main driver may activate or deactivate the display device DD to correspond to a user input, for example. The main driver may control operations of the display device DD and other modules. The main driver may include at least one microprocessor.

The cases EDC1 and EDC2 may receive the display module DM, the electronic module EM, and the power module PSM. The two cases EDC1 and EDC2 separated from each other are illustratively illustrated, but not limited thereto. Although not illustrated, the electronic device ED may further include a hinge structure for connecting the two cases EDC1 and EDC2. The cases EDC1 and EDC2 may be coupled to the window module WM. The cases EDC1 and EDC2 may protect components received in the cases EDC1 and EDC2, e.g., the display module DM, the electronic module EM, the power module PSM, or the like.

Figure 3A:
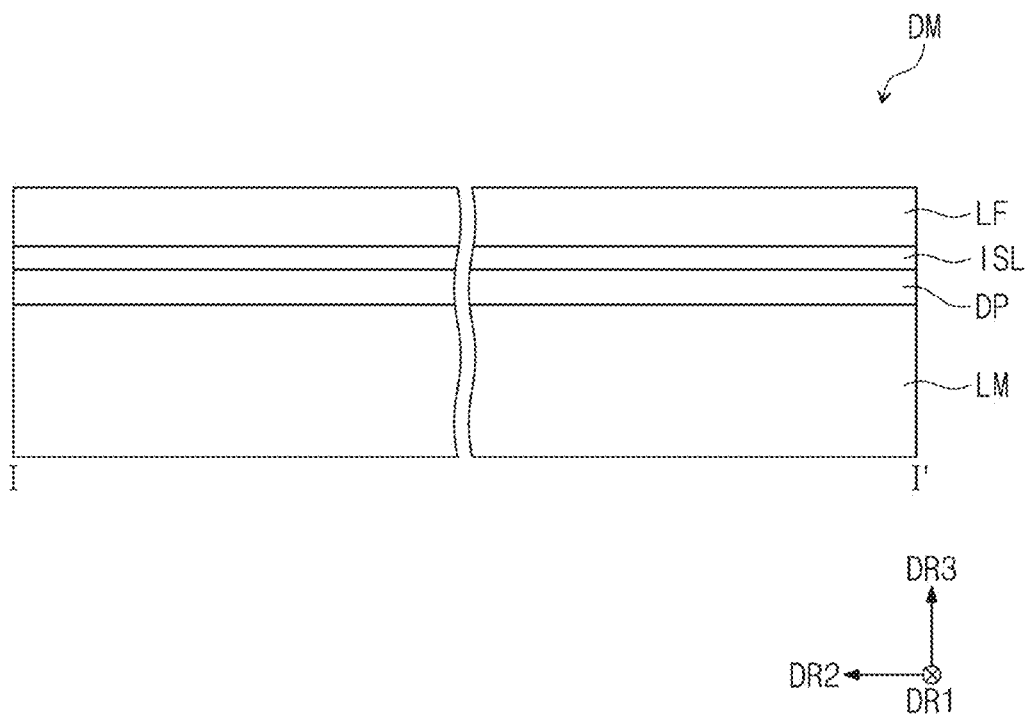
FIG. 3A is a cross-sectional view of an embodiment of a display module according to the disclosure.

FIG. 3A is a cross-sectional view of an embodiment of a display module according to the disclosure.

Referring to FIG. 3A, a display module DM may include a display panel DP, a sensor layer ISL disposed above the display panel DP, an optical film LF, and a lower member LM disposed below the display panel DP. An adhesive layer may be disposed between the members when desired.

The display panel DP may be a component which substantially generates an image. The display panel DP may be a light-emitting display panel. In an embodiment, the display panel DP may be an organic light-emitting display layer, an inorganic light-emitting display layer, an organic-inorganic light-emitting display layer, a quantum dot display layer, a micro-light-emitting diode ("micro-LED") display layer, or a nano-LED display layer, for example.

The sensor layer ISL may be disposed on the display panel DP. The sensor layer ISL may sense an external input applied from the outside. The sensor layer ISL may be an external sensor attached to the display panel DP. The sensor layer ISL may be an integrated sensor formed continuously during the process of fabricating the display panel DP.

The optical film LF may reduce the reflectivity of light incident from the outside. The optical film LF may include a retarder and a polarizer. The optical film LF may at least include a polarizing film. In an alternative embodiment, the optical film LF may include color filters. The color filters may have a predetermined arrangement. The arrangement of the color filters may be determined with regard to light-emitting colors of pixels PX included in the display panel DP. Furthermore, the optical film LF may further include a black matrix adjacent to the color filters. In an alternative embodiment, the optical film LF may be a destructive interference structure. In an embodiment, the destructive interference structure may include a first reflective layer and a second reflective layer arranged in different layers, for example. A first reflected light and a second reflected light respectively reflected from the first reflective layer and the second reflective layer may destructively interfere with each other. Thus, the reflectivity of the external light may be reduced. In another embodiment, the optical film LF may be omitted.

The lower member LM may include various functional members. The lower member LM may include a light shielding layer for blocking an incident light, an impact absorbing layer for absorbing an external impact, a supporting layer for supporting the display panel DP, a heat dissipation layer for emitting heat generated by the display panel DP, or the like.

Figure 3B:
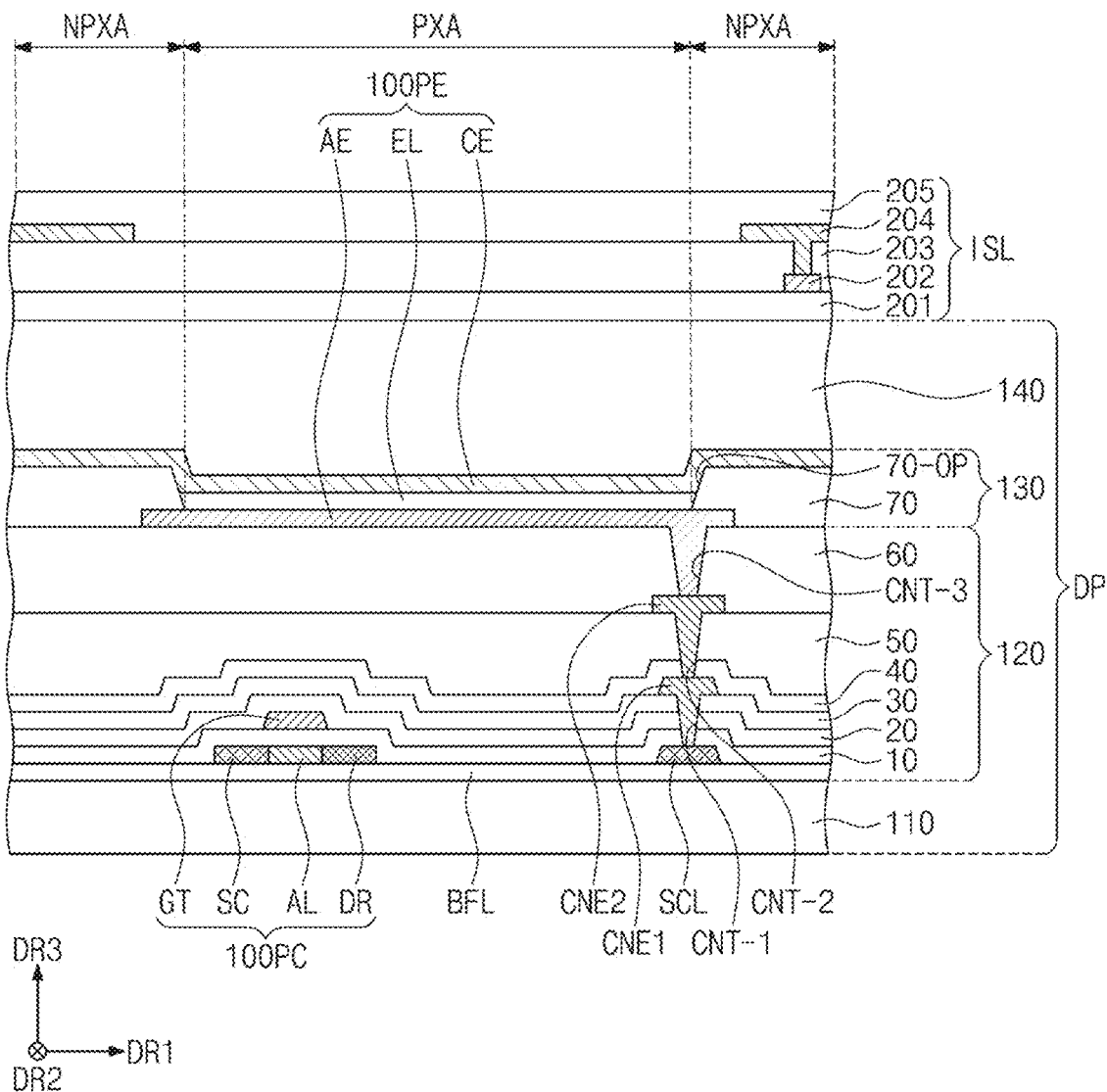
FIG. 3B is a cross-sectional view of an embodiment of an electronic device according to the disclosure.

FIG. 3B is a cross-sectional view of an embodiment of a display panel DP and a sensor layer ISL according to the disclosure.

Referring to FIG. 3B, a display panel DP may include a base layer 110, a circuit layer 120, a light-emitting element layer 130, and an encapsulation layer 140.

The base layer 110 may be a member which provides a base surface on which the circuit layer 120 is disposed. The base layer 110 may be a glass substrate, a metal substrate, a polymer substrate, or the like. However, the disclosure is not limited thereto, but the base layer 110 may be an inorganic layer, an organic layer, or a composite material layer.

The base layer 110 may have a multi-layered structure. In an embodiment, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer, for example. The silicon oxide layer and the amorphous silicon layer may be also referred to as a base barrier layer.

Each of the first and second synthetic resin layers may include a polyimide-based resin. Furthermore, each of the first and second synthetic resin layers may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. In the specification, "chemical component"-based resin means including a functional group of the "chemical component".

At least one inorganic layer may be formed on an upper surface of the base layer 110. The inorganic layer may include at least one of aluminum oxide, titanium oxide, silicon oxide, silicon nitride, silicon oxynitride, zirconium oxide, and hafnium oxide. The inorganic layer may include multiple layers. The multiple inorganic layers may make up a barrier layer and/or a buffer layer. In an embodiment, the display panel DP is illustrated as including a buffer layer BFL.

The buffer layer BFL may improve a bonding force between the base layer 110 and a semiconductor pattern. The buffer layer BFL may include at least one of silicon oxide, silicon nitride, and silicon oxynitride. In an embodiment, the buffer layer BFL may include a structure in which a silicon oxide layer and a silicon nitride layer are alternately laminated, for example.

The semiconductor pattern may be disposed on the buffer layer BFL. The semiconductor pattern may include polysilicon. However, the disclosure is not limited thereto, and the semiconductor pattern may include amorphous silicon, low-temperature polycrystalline silicon, or an oxide semiconductor.

FIG. 3B illustrates only a part of the semiconductor pattern, and the semiconductor pattern may be further disposed in another area. Semiconductor patterns may be arranged across pixels in a predetermined rule. An electrical property of the semiconductor pattern may vary depending on whether it is doped. The semiconductor pattern may include a first area having high conductivity and a second area having low conductivity. The first area may be doped with an N-type dopant or a P-type dopant. A P-type transistor may include a doping area doped with the P-type dopant, and an N-type transistor may include a doping area doped with the N-type dopant. The second area may be a non-doping area or may be an area doped with a concentration lower than that of the first area.

A conductivity of the first area is greater than a conductivity of the second area. The first area may substantially serve as an electrode or a signal line. The second area may substantially correspond to an active (or channel) of a transistor. In other words, a portion of the semiconductor pattern may be an active of the transistor, another portion thereof may be a source or a drain of the transistor, and another portion thereof may be a connection electrode or a connection signal line.

Each of pixels may have an equivalent circuit including seven transistors, one capacitor, and a light-emitting element, and the equivalent circuit of the pixel may be modified in various forms. One transistor 100PC and one light-emitting element 100PE included in the pixel are illustrated as an embodiment in FIG. 3B.

A source SC, an active AL (or an active area), and a drain DR of the transistor 100PC may be formed from the semiconductor pattern. The source SC and the drain DR may extend in directions facing each other from the active AL on a cross section. A portion of a connection signal line SCL formed from the semiconductor pattern is illustrated in FIG. 3B. Although not separately illustrated, the connection signal line SCL may be connected with the drain DR of the transistor 100PC in a plan view.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer and may have a single- or multi-layered structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a single silicon oxide layer. As well as the first insulating layer 10, an insulating layer of a circuit layer 120 to be described below may be an inorganic layer and/or an organic layer and may have a single- or multi-layered structure. The inorganic layer may include, but is not limited to, at least one of the materials described above.

A gate GT of the transistor 100PC may be disposed on the first insulating layer 10. The gate GT may be a portion of a metal pattern. The gate GT may overlap the active AL. The gate GT may function as a mask in the process of doping the semiconductor pattern.

A second insulating layer 20 may be disposed on the first insulating layer 10 and may cover the gate GT. The second insulating layer 20 may overlap pixels in common. The second insulating layer 20 may be an inorganic layer and/or an organic layer and may have a single- or multi-layered structure. The second insulating layer 20 may include at least one of silicon oxide, silicon nitride, and silicon oxynitride. In an embodiment, the second insulating layer 20 may have a multi-layered structure including a silicon oxide layer and a silicon nitride layer.

A third insulating layer 30 may be disposed on the second insulating layer 20. The third insulating layer 30 may have a single- or multi-layered structure. In an embodiment, the third insulating layer 30 may have a multi-layered structure including a silicon oxide layer and a silicon nitride layer, for example.

A first connection electrode CNE1 may be disposed on the third insulating layer 30. The first connection electrode CNE1 may be connected with the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected with the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light-emitting element layer 130 may be disposed on the circuit layer 120. The light-emitting element layer 130 may include a light-emitting element 100PE. In an embodiment, the light-emitting element layer 130 may include an organic light-emitting material, an inorganic light-emitting material, an organic-inorganic light-emitting material, a quantum dot, a quantum rod, a micro-LED, or a nano-LED, for example. Hereinafter, an embodiment in which the light-emitting element 100PE is an organic light-emitting element will be described, but not particularly limited thereto.

The light-emitting element 100PE may include a first electrode AE, a light-emitting layer EL, and a second electrode CE.

The first electrode AE may be disposed on the sixth insulating layer 60. The first electrode AE may be connected with the second connection electrode CNE2 through a contact hole CNT-3 penetrating the sixth insulating layer 60.

A pixel definition layer 70 may be disposed on the sixth insulating layer 60 and may cover a portion of the first electrode AE. An opening 70-OP may be defined in the pixel definition layer 70. The opening 70-OP of the pixel definition layer 70 may expose at least a portion of the first electrode AE.

A display area DA (refer to FIG. 1A) may include a light-emitting area PXA and a non-light-emitting area NPXA adjacent to the light-emitting area PXA. The non-light-emitting area NPXA may surround the light-emitting area PXA. In an embodiment, the light-emitting area PXA is defined to correspond to a portion of the first electrode AE, which is exposed by the opening 70-OP.

The light-emitting layer EL may be disposed on the first electrode AE. The light-emitting layer EL may be disposed in an area corresponding to the opening 70-OP. In other words, the light-emitting layer EL may be separately formed in each of the pixels. When the light-emitting layer EL is separately formed in each of the pixels, each of the light-emitting layers EL may emit light of at least one of a blue color, a red color, and a green color. However, the disclosure is not limited thereto. The light-emitting layer EL may be connected with the pixels to be provided in common. In this case, the light-emitting layer EL may provide blue light or white light.

The second electrode CE may be disposed on the light-emitting layer EL. The second electrode CE may have an integral shape and may be disposed in common in a plurality of pixels.

Although not illustrated, a hole control layer may be disposed between the first electrode AE and the light-emitting layer EL. The hole control layer may be disposed in common in the light-emitting area PXA and the non-light-emitting area NPXA. The hole control layer may include a hole transport layer and may further include a hole injection layer. An electron control layer may be disposed between the light-emitting layer EL and the second electrode CE. The electron control layer may include an electron transport layer and may further include an electron injection layer. The hole control layer and the electron control layer may be formed in common in the plurality of pixels using an open mask.

The encapsulation layer 140 may be disposed on the light-emitting element layer 130. The encapsulation layer 140 may include an inorganic layer, an organic layer, and an inorganic layer sequentially laminated, and layers constituting the encapsulation layer 140 are not limited thereto.

The inorganic layers may protect the light-emitting element layer 130 from moisture and oxygen, and the organic layer may protect the light-emitting element layer 130 from foreign substances such as dust particles. The inorganic layers may include a silicon nitride layer, a silicon oxynitride layer, a silicon oxide layer, a titanium oxide layer, an aluminum oxide layer, or the like. The organic layer may include, but is not limited to, an acrylic-based organic layer.

A sensor layer ISL may include a base layer 201, a first conductive layer 202, a sensing insulating layer 203, a second conductive layer 204, and a cover insulating layer 205.

The base layer 201 may be an inorganic layer including at least any one of silicon nitride, silicon oxynitride, and silicon oxide. In an alternative embodiment, the base layer 201 may be an organic layer including an epoxy resin, an acrylate resin, or an imide-based resin. The base layer 201 may have a single-layered structure or may have a multi-layered structure laminated along a third direction DR3.

Each of the first conductive layer 202 and the second conductive layer 204 may have a single-layered structure or may have a multi-layered structure laminated along the third direction DR3.

A conductive layer of a single-layered structure may include a metal layer or a transparent conductive layer. The metal layer may include molybdenum, silver, titanium, copper, aluminum, or an alloy thereof. The transparent conductive layer may include transparent conductive oxide such as indium tin oxide ("ITO"), indium zinc oxide ("IZO"), zinc oxide (ZnO), or indium zinc tin oxide ("IZTO"). In addition, the transparent conductive layer may include conductive polymer such as poly(3,4-ethylenedioxythiophene) ("PEDOT"), metal nanowire, graphene, or the like.

The conductive layer of the multi-layered structure may include metal layers. The metal layers may have, e.g., a three-layered structure of titanium/aluminum/titanium. The conductive layer of the multi-layered structure may include at least one metal layer and at least one transparent conductive layer.

At least any one of the sensing insulating layer 203 and the cover insulating layer 205 may include an inorganic layer. The inorganic layer may include at least one of aluminum oxide, titanium oxide, silicon oxide, silicon nitride, silicon oxynitride, zirconium oxide, and hafnium oxide.

At least any one of the sensing insulating layer 203 and the cover insulating layer 205 may include an organic layer. The organic layer may include at least any one of an acrylic-based resin, a methacrylic-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

Figure 4:
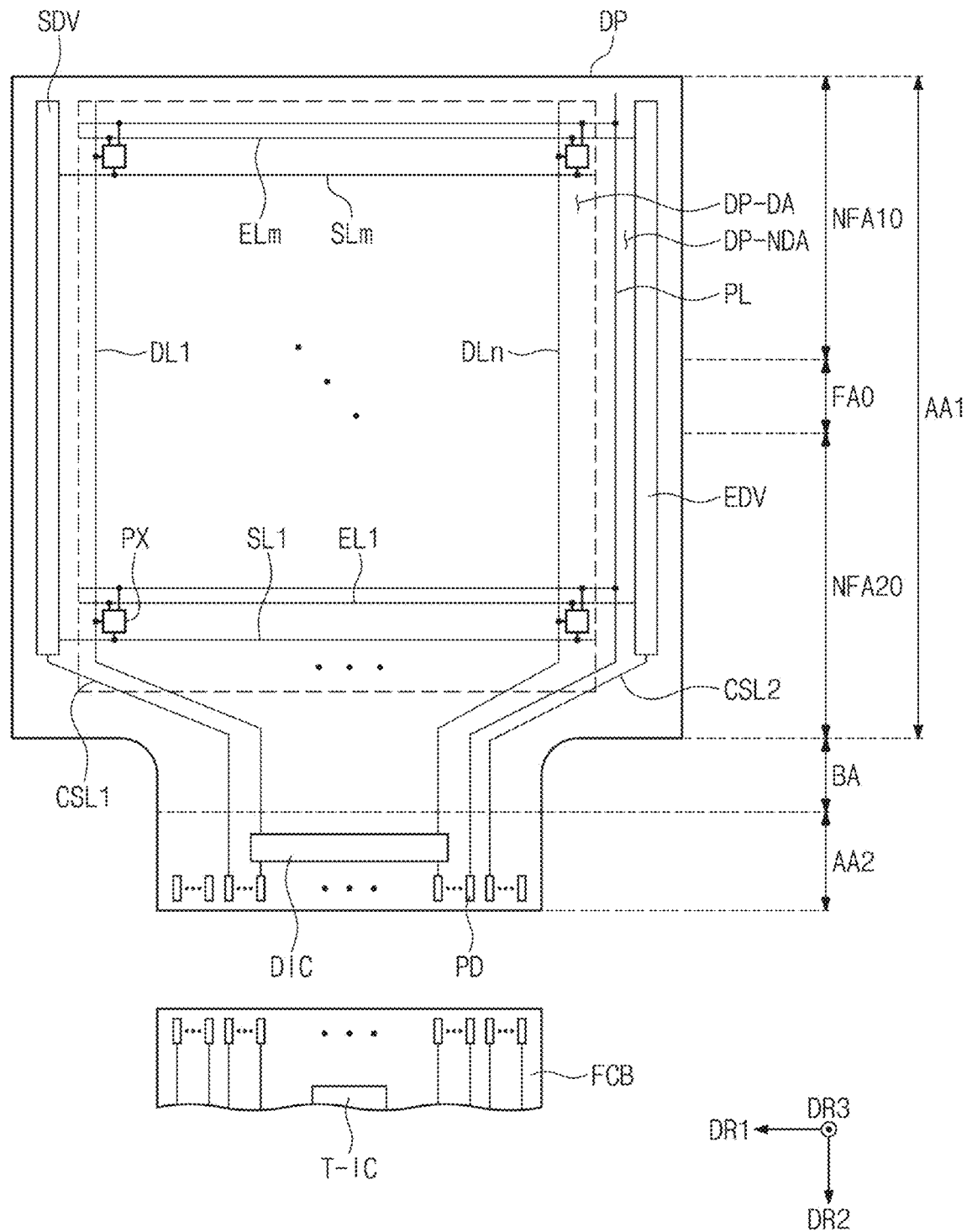
FIG. 4 is a plan view of an embodiment of a display panel according to the disclosure.

FIG. 4 is a plan view of an embodiment of a display panel according to the disclosure.

Referring to FIG. 4, a display area DP-DA and a non-display area DP-NDA around the display area DP-DA may be defined in a display panel DP. The display area DP-DA and the non-display area DP-NDA may be distinguished depending on whether the pixel PX is disposed. The pixel PX may be disposed in the display area DP-DA. A scan driver SDV, a data driver, and a light-emitting driver EDV may be arranged in the non-display area DP-NDA. The data driver may be a portion of a circuit included in a driving chip DIC.

The display panel DP may include a first panel area AA1, a bending area BA, and a second panel area AA2 defined along a second direction DR2. The second panel area AA2 and the bending area BA may be a portion of the non-display area DP-NDA. The bending area BA may be disposed between the first panel area AA1 and the second panel area AA2.

The first panel area AA1 may be an area corresponding to a display surface DS of FIG. 1A. The first panel area AA1 may include a first non-folding area NFA10, a second non-folding area NFA20, and a folding area FA0. The first non-folding area NFA10, the second non-folding area NFA20, and the folding area FA0 may correspond to a first non-folding area NFA1, a second non-folding area NFA2, and a folding area FA of FIGS. 1A and 1B, respectively.

The bending area BA and the second panel area AA2, which are parallel to the first direction DR1, may be less in width (or length) than the first panel area AA1 parallel to the first direction DR1. An area where a length in the direction of a bending axis is short may be more easily bent.

The display panel DP may include a plurality of pixels PX, a plurality of scan lines SL1-SLm, a plurality of data lines DL1-DLn, a plurality of light-emitting lines EL1-ELm, first and second control lines CSL1 and CSL2, a power line PL, and a plurality of pads PD. Herein, "m" and "n" are natural numbers. The pixels PX may be connected with the scan lines SL1-SLm, the data lines DL1-DLn, and the light-emitting lines EL1-ELm.

The scan lines SL1-SLm may extend in the first direction DR1 and may be electrically connected with the scan driver SDV. The data lines DL1-DLn may extend in the second direction DR2 and may be electrically connected with the driving chip DIC via the bending area BA. The light-emitting lines EL1-ELm may extend in the first direction DR1 and may be electrically connected with the light-emitting driver EDV.

The power line PL may include a portion extending in the second direction DR2 and a portion extending in the first direction DR1. The portion extending in the first direction DR1 and the portion extending in the second direction DR2 may be arranged in different layers. The portion which extends in the second direction DR2 in the power line PL may extend to the second panel area AA2 via the bending area BA. The power line PL may supply a first voltage to the pixels PX.

A first control line CSL1 may be connected with the scan driver SDV and may extend toward a lower end of the second panel area AA2 via the bending area BA. A second control line CSL2 may be connected with the light-emitting driver EDV and may extend toward the lower end of the second panel area AA2 via the bending area BA.

In a plan view, pads PD may be arranged adjacent to the lower end of the second panel area AA2. The driving chip DIC, the power line PL, the first control line CSL1, and the second control line CSL2 may be electrically connected with the pads PD. A flexible circuit board FCB may be electrically connected with the pads PD through an anisotropic conductive adhesive layer.

Figure 5A:
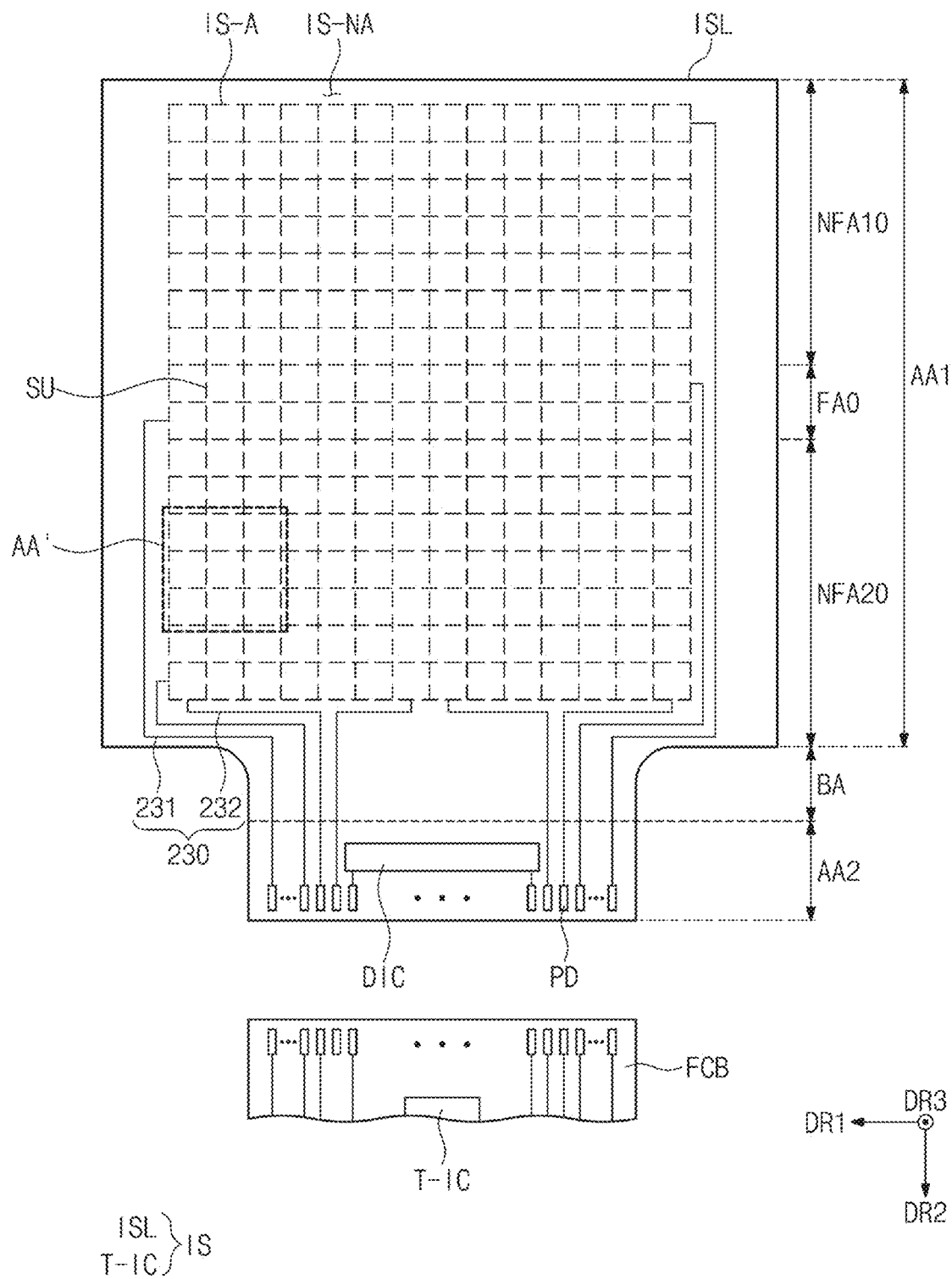
FIG. 5A is a plan view of an embodiment of an input sensor according to the disclosure.
Figure 5B:
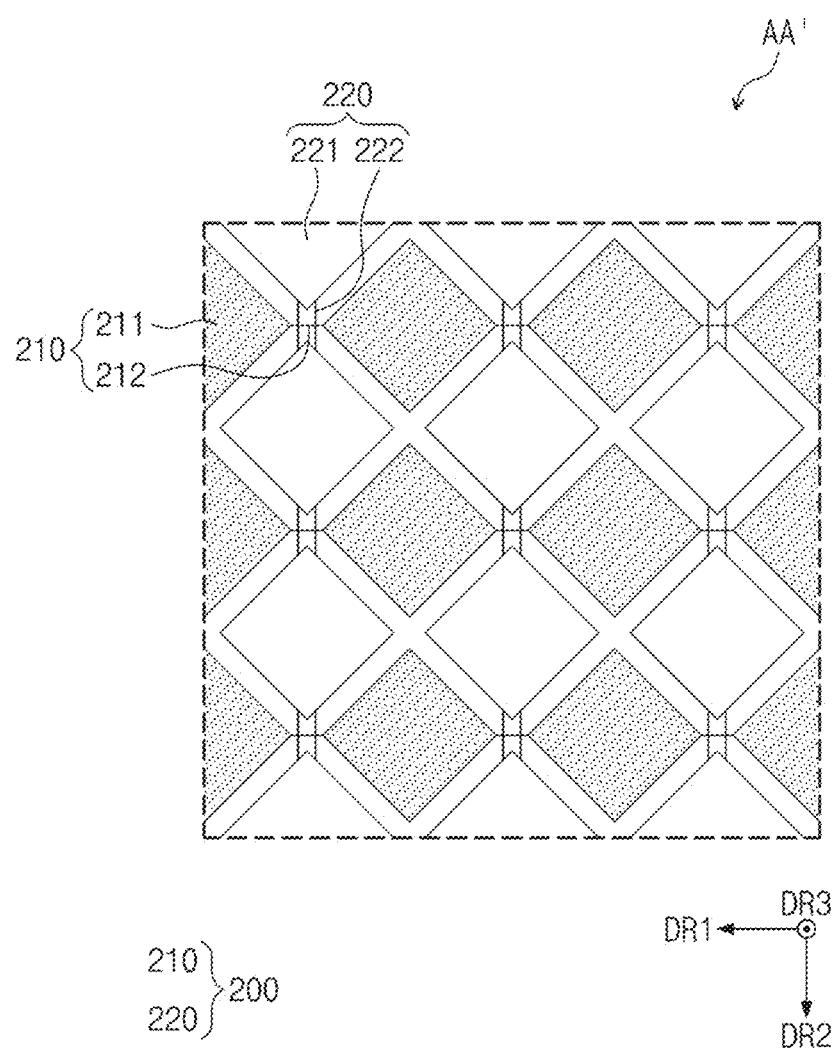
FIG. 5B is a plan view enlarging an area AA' illustrated in FIG. 5A.

FIG. 5A is a plan view of an embodiment of an input sensor according to the disclosure. FIG. 5B is a plan view enlarging an area AA' illustrated in FIG. 5A. An input sensor IS may include a sensor layer ISL and a sensor driver T-IC.

Referring to FIGS. 5A and 5B, a sensing area IS-A and a peripheral area IS-NA may be defined in the sensor layer ISL. The sensing area IS-A may be an area which is activated according to an electrical signal. In an embodiment, the sensing area IS-A may be an area for sensing an external input, for example. The peripheral area IS-NA may be adjacent to the sensing area IS-A to surround the sensing area IS-A.

The sensor layer ISL may include a plurality of sensing electrodes 200 and a plurality of sensing lines 230. The plurality of sensing electrodes 200 may include a plurality of first sensing electrodes 210 and a plurality of second sensing electrodes 220.

The first sensing electrodes 210 and the second sensing electrodes 220 may be arranged in the sensing area IS-A, and the sensing lines 230 may be arranged in the peripheral area IS-NA. The sensor layer ISL may obtain information about an external input by a change in mutual capacitance between the first sensing electrodes 210 and the second sensing electrodes 220.

The sensor layer ISL may include a plurality of sensing units SU. Each of the plurality of sensing units SU may be defined as an area where any one first sensing electrode 210 of the first sensing electrodes 210 and any one second sensing electrode 220 of the second sensing electrodes 220 cross each other.

Each of the first sensing electrodes 210 may extend along the first direction DR1, and the first sensing electrodes 210 may be arranged along the second direction DR2. The first sensing electrodes 210 may include first portions 211 and second portions 212. The second portion 212 may be adjacent to the two first portions 211 adjacent to each other.

The second sensing electrodes 220 may be arranged along the first direction DR1, and each of the second sensing electrodes 220 may extend along the second direction DR2. The second sensing electrodes 220 may include patterns 221 and connection patterns 222 (or bridge patterns). The connection patterns 222 may electrically connect the two patterns 221 adjacent to each other. The two patterns 221 adjacent to each other may be connected with each other by two connection patterns 222, but not limited thereto. The second portion 212 may be insulated from the two connection patterns 222 to cross the two connection patterns 222.

The patterns 221, the first portions 211, and the second portions 212 may be arranged in the same layer, and the connection patterns 222 may be arranged in a layer different from the layer in which the patterns 221, the first portions 211, and the second portions 212 are arranged. In an embodiment, the patterns 221, the first portions 211, and the second portions 212 may be included in a second conductive layer 204 (refer to FIG. 3B), and the connection pattern 222 may be included in a first conductive layer 202 (refer to FIG. 3B), for example. The above structure may be also referred to as a bottom bridge structure. However, the disclosure is not specifically limited thereto. In an embodiment, the patterns 221, the first portions 211, and the second portions 212 may be included in the first conductive layer 202 (refer to FIG. 3B), and the connection patterns 222 may be included in the second conductive layer 204 (refer to FIG. 3B), for example. The above structure may be also referred to as a top bridge structure.

The shapes of the first sensing electrodes 210 and the second sensing electrodes 220 and the arrangement relationships between the first sensing electrodes 210 and the second sensing electrodes 220, which are illustrated in FIG. 5B, are only illustrated as one of embodiments. The shapes of the first sensing electrodes 210 and the second sensing electrodes 220 and the arrangement relationships between the first sensing electrodes 210 and the second sensing electrodes 220 constituting the sensor layer ISL are not limited to those illustrated in FIG. 5B.

The sensing lines 230 may be electrically connected with pad corresponding to the pads PD, respectively. The sensing lines 230 may include lines 231 and cross lines 232.

The lines 231 may be electrically connected with the first sensing electrodes 210, respectively. Some of the lines 231 may be connected with left sides of some of the first sensing electrodes 210, respectively, and the others of the lines 231 may be connected with right sides of the others of the first sensing electrodes 210, respectively. The cross lines 232 may be electrically connected with the second sensing electrodes 220, respectively. However, a connection relationship between the lines 231 and the first sensing electrodes 210 and a connection relationship between the cross lines 232 and the second sensing electrodes 220 are not limited to the example illustrated in FIG. 5A.

A sensor driver T-IC may be electrically connected with the sensor layer ISL to provide the sensor layer ISL with a driving signal and may calculate coordinates from an external input. The sensor driver T-IC may be disposed (e.g., mounted) on a flexible circuit board FCB (refer to FIG. 2). The sensor driver T-IC may be electrically connected with the lines 231 and the cross lines 232. A description will be given in detail of the sensor driver T-IC with reference to FIG. 6.

Figure 5C:
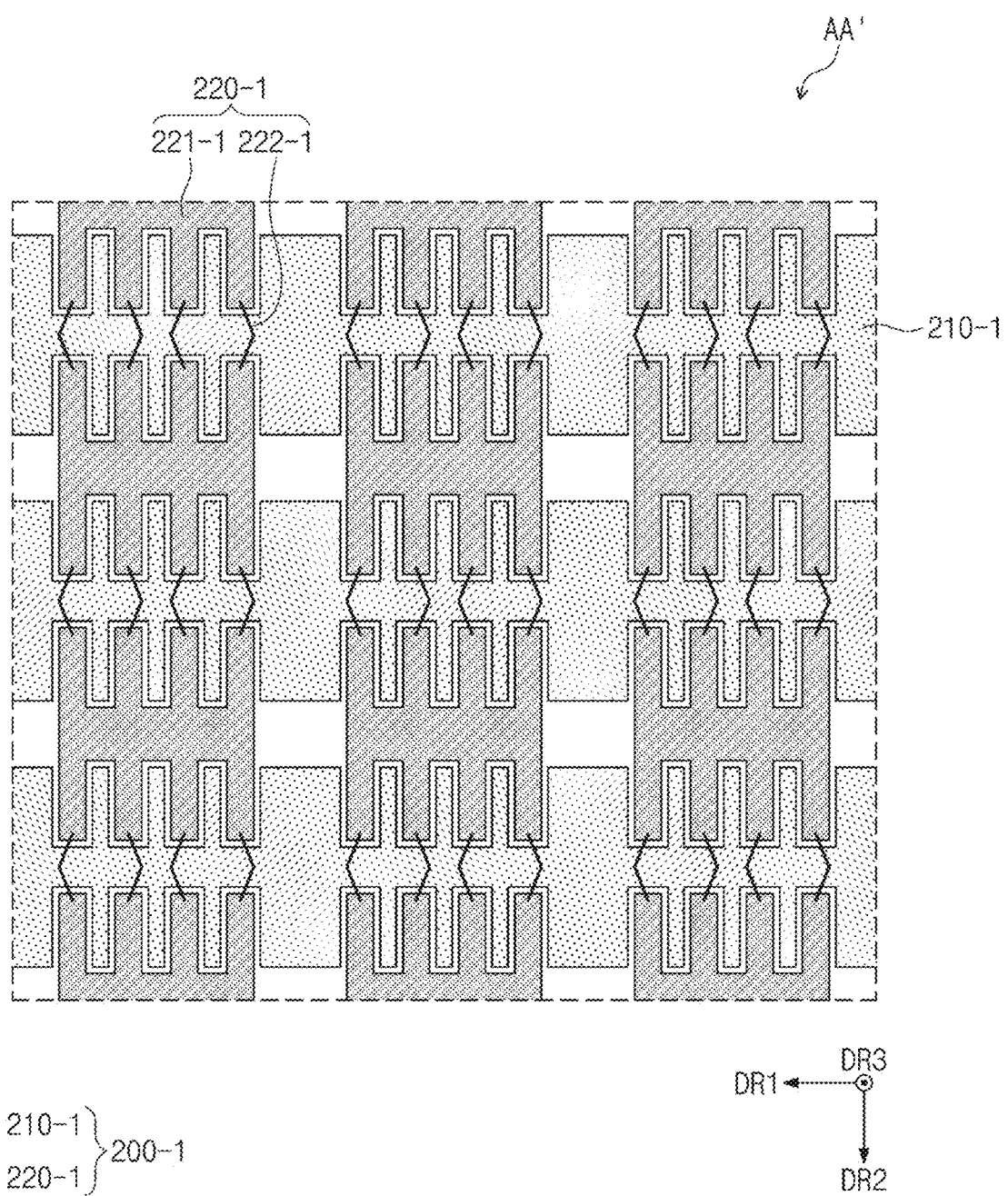
FIG. 5C is a plan view of an area AA' illustrated in FIG. 5A.

FIG. 5C is a plan view enlarging an area AA' illustrated in FIG. 5A according to an embodiment.

FIG. 5C illustrates a plurality of sensing electrodes 200-1, each of which has a shape different from that in FIG. 5B. The plurality of sensing electrodes 200-1 may include first sensing electrodes 210-1 and second sensing electrodes 220-1.

FIG. 5C illustrates the first sensing electrodes 210-1 and the second sensing electrodes 220-1. The first sensing electrodes 210-1 and the second sensing electrodes 220-1 may have a bar shape.

Each of the first sensing electrodes 210-1 may extend along the first direction DR1, and the first sensing electrodes 210-1 may be arranged along the second direction DR2. The second sensing electrodes 220-1 may be arranged along the first direction DR1, and each of the second sensing electrodes 220-1 may extend along the second direction DR2. The second sensing electrodes 220-1 may include patterns 221-1 and connection patterns 222-1 (or bridge patterns). The connection patterns 222-1 may electrically connect the two patterns 221-1 adjacent to each other. The two patterns 221-1 adjacent to each other may be connected with each other by two connection patterns 222-1, but not limited thereto. The one first sensing electrode 210-1 may be insulated from the two connection patterns 222-1 to cross the two connection patterns 222-1. It is illustratively shown that the first sensing electrodes 210-1 and the patterns 221-1 have the interlocking shapes, but not particularly limited thereto.

Each of the first sensing electrodes 210 or 210-1 and the second sensing electrodes 220 or 220-1 described with reference to FIGS. 5B and 5C may have a mesh structure. In this case, an opening may be defined in each of the first sensing electrodes 210 or 210-1 and the second sensing electrodes 220 or 220-1. However, the disclosure is not limited thereto. Each of the first sensing electrodes 210 or 210-1 and the second sensing electrodes 220 or 220-1 may be a transparent electrode in which an opening is not defined.

Figure 6:
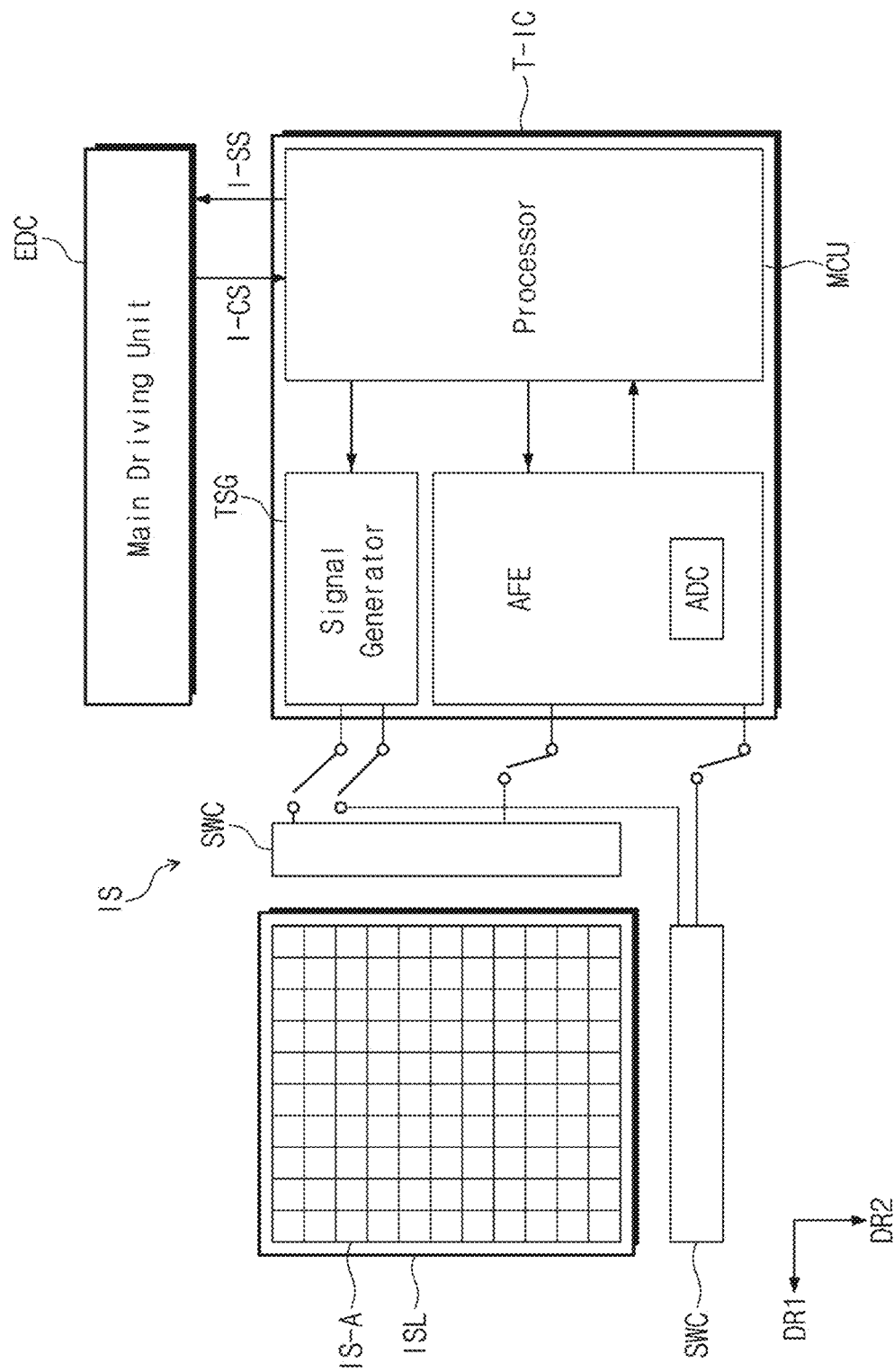
FIG. 6 is a drawing illustrating an embodiment of an input sensor according to the disclosure.

FIG. 6 is a drawing illustrating an embodiment of an input sensor according to the disclosure. An input sensor IS may include a sensor layer ISL and a sensor driver T-IC.

The sensor driver T-IC may drive the sensor layer ISL. The sensor driver T-IC may calculate information about coordinates of an input based on the signal received from the sensor layer ISL and may provide the main driver EDC with a coordinate signal I-SS having the information about the coordinates. The sensor driver T-IC may receive a control signal I-CS from the main driver EDC.

The main driver EDC may control the overall operation of an electronic device ED. In an embodiment, the main driver EDC may control operations of a display driver (not shown) and the sensor driver T-IC of a display panel, for example. The main driver EDC may include at least one microprocessor. The main driver EDC may be also referred to as a host. The main driver EDC may execute an operation corresponding to a user input based on the coordinate signal I-SS.

The sensor driver T-IC may include a signal generator TSG, an analog front end AFE, and a processor MCU.

The signal generator TSG and the analog front end AFE may be connected with the sensor layer ISL. The signal generator TSG and the analog front end AFE may transmit and receive a signal with the processor MCU. The signal generator TSG may apply a transmit signal to a transmit electrode among a plurality of sensing electrodes 200 (refer to FIG. 5B). The signal generator TSG may receive a transmit command from the processor MCU and may apply a transmit signal to the sensing electrodes.

The analog front end AFE may include an analog signal adjustment circuit. The analog front end AFE may amplify a transmit or receive signal and may remove noise. The analog front end AFE may include an analog-to-digital converter ADC. The analog front end AFE may be connected with the processor MCU. The analog front end AFE may provide the processor MCU with a digital signal and may receive a sensing signal such as a feedback signal from the processor MCU.

The analog-to-digital converter ADC may convert an input signal in an analog form, which is received by the input sensor IS, into a digital signal. The analog-to-digital converter ADC may be plural in number. The plurality of analog-to-digital converters ADC may be connected with a plurality of sensing electrodes, respectively.

The processor MCU may generate coordinates of an input of a user based on the digital signal received from the analog front end AFE. The processor MCU may process various pieces of information about an input of the user as well as generating the coordinates of the input. The processor MCU may be electrically connected with the main driver EDC.

The sensor layer ISL and the sensor driver T-IC may be connected with a plurality of sensing lines 230 (refer to FIG. 5A). The plurality of sensing lines 230 may include a plurality of switches SWC. In an embodiment, the plurality of switches SWC may selectively connect sensing electrodes 200 (refer to FIG. 5B) with the sensor driver T-IC. The plurality of switches SWC may be disposed in a peripheral area IS-NA (refer to FIG. 5A) of the sensor layer ISL or a flexible circuit board FCB where the sensor driver T_IC is disposed.

Figure 7:
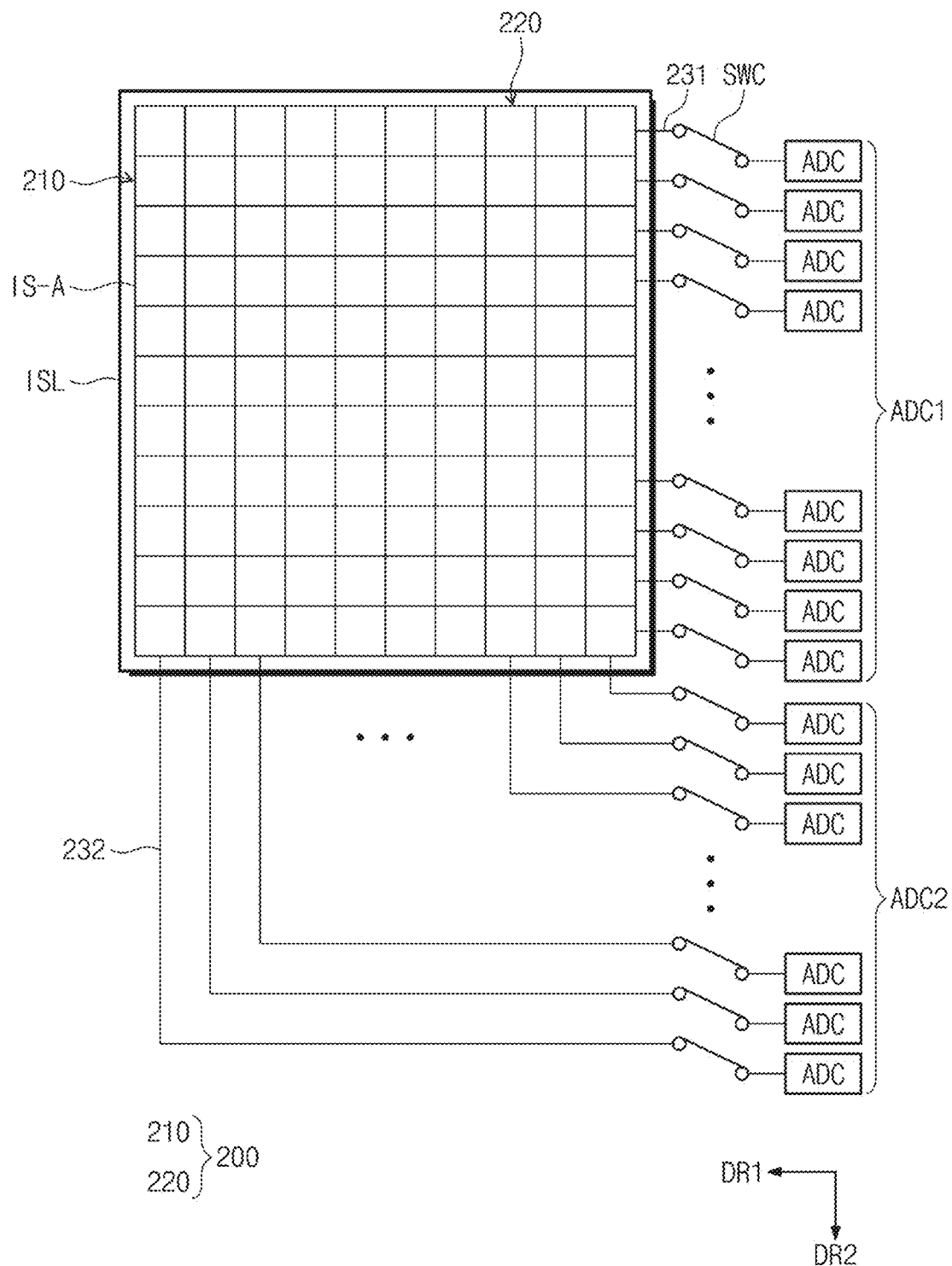
FIG. 7 is a drawing illustrating an embodiment of a sensor layer and a plurality of analog-to-digital converters according to the disclosure.
Figure 8:
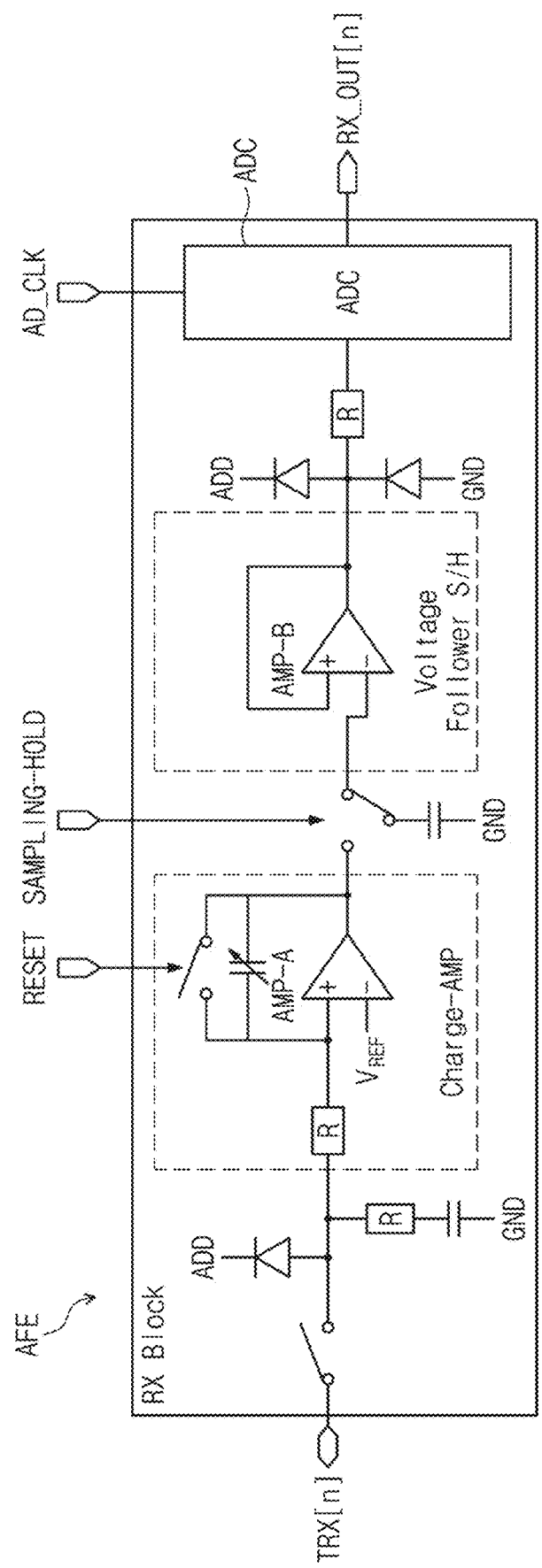
FIG. 8 is a drawing illustrating an embodiment of an analog front end according to the disclosure.

FIG. 7 is a drawing illustrating an embodiment of a sensor layer and a plurality of analog-to-digital converters according to the disclosure. FIG. 8 is a drawing illustrating an embodiment of an analog front end according to the disclosure. Hereinafter, a description will be given with reference to FIGS. 5A and 5B.

Referring to FIG. 7, a plurality of sensing electrodes 200 arranged in a sensing area IS-A of a sensor layer ISL may be connected one-to-one with a plurality of analog-to-digital converters ADC, respectively.

In an embodiment, the plurality of sensing electrodes 200 may be the same in number as a plurality of analog-to-digital converters ADC. In other words, all the sensing electrodes 200 may be connected with the analog-to-digital converters ADC, respectively. The sensing electrodes and the analog-to-digital converters ADC may be connected through sensing lines 231 and 232. In an embodiment, all of a plurality of first sensing electrodes 210 extending in a first direction DR1 may be connected one-to-one with first analog-to-digital converters ADC1. All of a plurality of second sensing electrodes 220 extending in a second direction DR2 may be connected one-to-one with second analog-to-digital converters ADC2, for example. The first sensing electrodes 210 and the first analog-to-digital converters ADC1 may be the same in number as each other. The second sensing electrodes 220 and the second analog-to-digital converters ADC2 may be the same in number as each other.

Thus, the plurality of sensing electrodes 200 may be sampled at the same time by the plurality of analog-to-digital converters ADC respectively connected with the plurality of sensing electrodes 200. In other words, according to the disclosure, a time desired for some of the plurality of sensing electrodes 200 to be connected with analog-to-digital converters ADC prepared for the purpose may be reduced. Thus, an embodiment of the disclosure may extend a sampling time of each of the sensing electrodes 200 to obtain a more accurate signal.

In an embodiment, a plurality of switches SWC may be respectively connected between the sensing electrodes 200 and the analog-to-digital converters ADC. The plurality of switches SWC may selectively connect some of the plurality of sensing electrodes 200 and some of the plurality of analog-to-digital converters ADC in response to detecting a signal purposed based on an input signal. Even when the plurality of sensing electrodes 200 and the plurality of analog-to-digital converters ADC are selectively connected with each other, a connection time may be reduced by analog-to-digital converters ADC capable of being connected one-to-one with the selected sensing electrodes.

The plurality of analog-to-digital converters ADC and the plurality of sensing electrodes 200 may not be accurately the same in number as each other. The number of the plurality of analog-to-digital converters ADC may be at least greater than a half of the number of the plurality of sensing electrodes 200.

FIG. 8 is a drawing illustrating an embodiment of an analog front end AFE including an analog-to-digital converter ADC. The analog front end AFE may receive an input signal TRX[n] in an analog form, which is input from the outside, and may perform noise cancellation and preprocessing of the input signal to generate a digital signal RX_OUT[n] by an analog-to-digital converter ADC. The analog front end AFE may be plural in number. The plurality of sensing electrodes 200 (refer to FIG. 5B) may be connected one-to-one with the plurality of analog front ends AFE, respectively. The analog front end AFE may be also referred to as an input signal receiver circuit.

The analog front end AFE may include a charge amplifier AMP-A of a charge amplifier device Charge-AMP and an amplifier AMP-B of a voltage follower Voltage Follow S/H. The charge amplifier AMP-A may initiate to drive the charge amplifier device Charge-AMP at an input timing of a reset signal RESET. Voltages of sensing electrodes upon sensing may be determined at an input timing of a sampling-hold signal SAMPLING-HOLD. The amplifier AMP-B of the voltage follower Voltage Follow S/H may be connected with the analog-to-digital converter ADC. The analog-to-digital converter ADC may convert and output the input voltage value into a digital value based on a clock signal AD_CLK. In the illustrated embodiment, reference characters ADD, R, GND, VREF may respectively refer to a power voltage, a resister, a ground voltage and a reference voltage.

Figure 9:
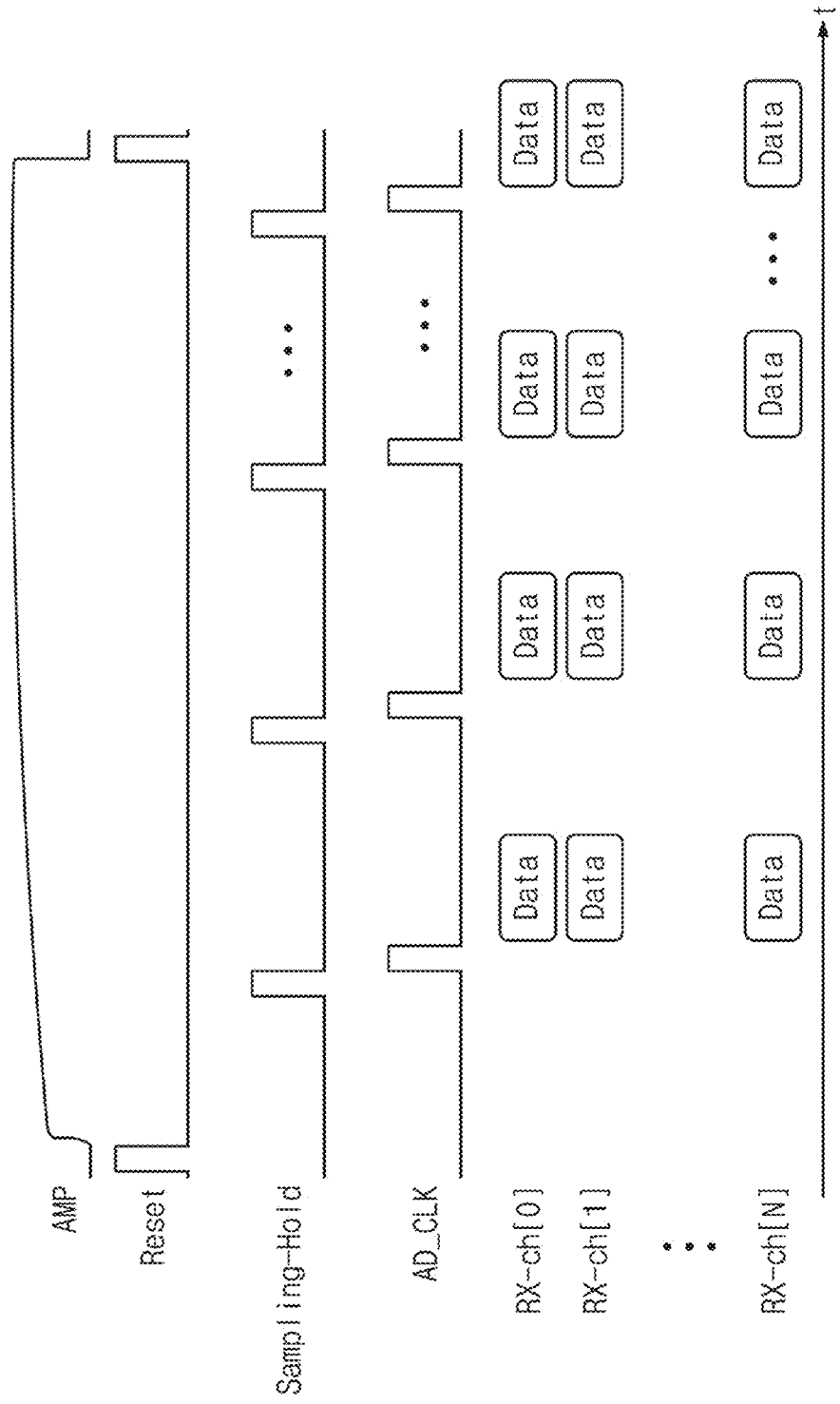
FIG. 9 is a drawing illustrating an embodiment of a sensing waveform according to the disclosure.

FIG. 9 is a drawing illustrating an embodiment of a sensing waveform according to the disclosure. After an amplifier AMP is reset to be stable in waveform of the amplifier AMP, a voltage value of an input signal may be held such that an analog signal which is the input signal is converted into a digital signal. Selected sensing electrodes connected with analog-to-digital converters ADC may perform sampling and analog-to-digital conversion at the same time.

In an embodiment, because a plurality of sensing electrodes is connected one-to-one with a plurality of analog-to-digital converters in parallel to be sampled at the same time, they may reduce noise which occurs over a channel change time when there is a change in connection between analog-to-digital converters and sensing electrodes. In the illustrated embodiment, reference characters RX-ch[0] . . . RX-ch[N] may refer to data signals of channels, respectively.

In other words, an electronic device according to the disclosure may relax limitations on a sensing time, which occur due to the channel change time. The waveform of the amplifier AMP leads to signal enhancement due to the accumulation of sampling and analog-to-digital conversion values from a maximum saturation state. As a result, the electronic device may effectively detect a minute signal difference according to whether there is a target object.

Figure 10:
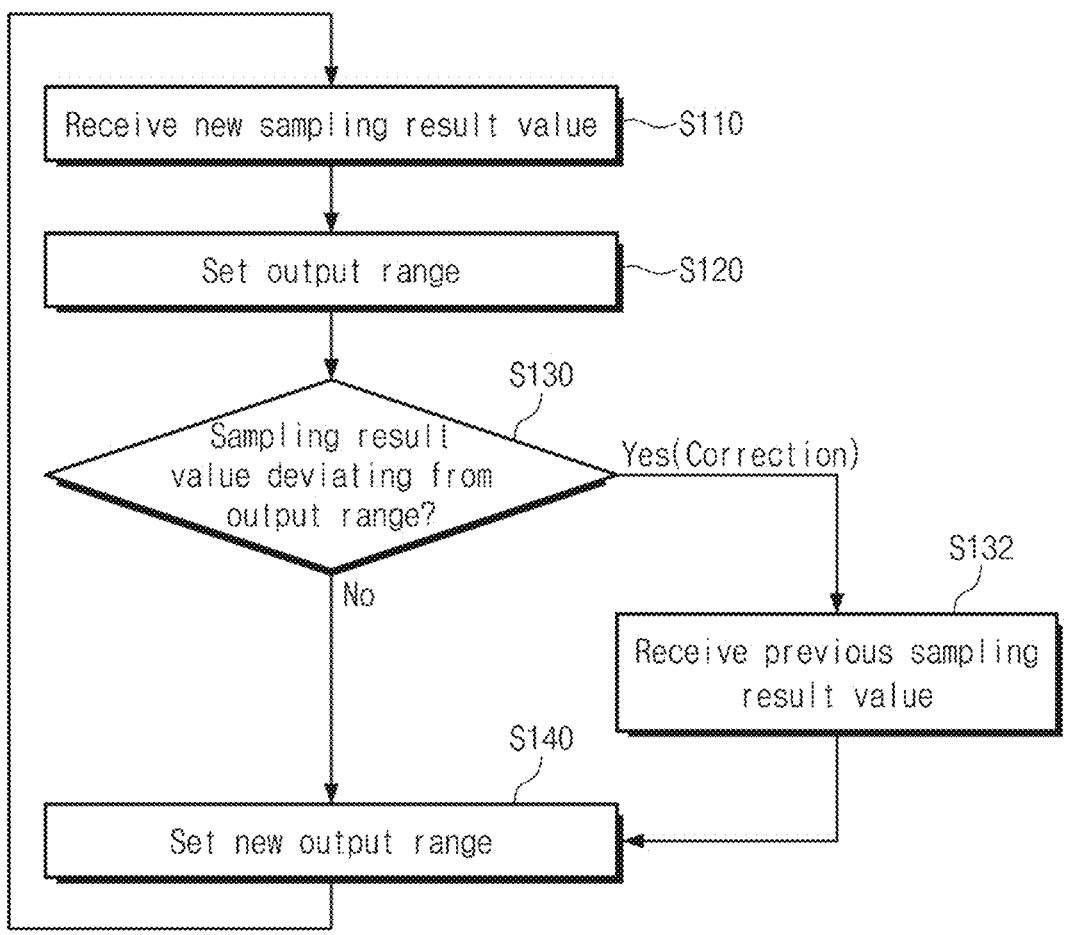
FIG. 10 is a flowchart illustrating an embodiment of a method for calculating a correction value according to the disclosure.
Figure 11A:
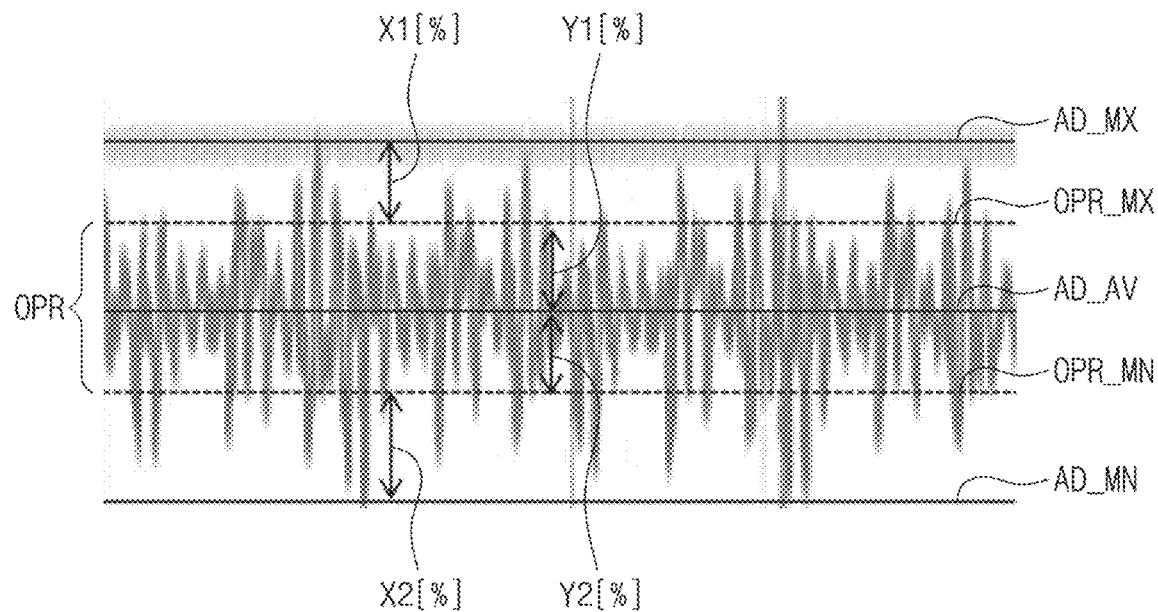
FIGS. 11A and 11B are waveform pictures illustrating an embodiment of an output range and a correction value according to the disclosure.
Figure 11B:
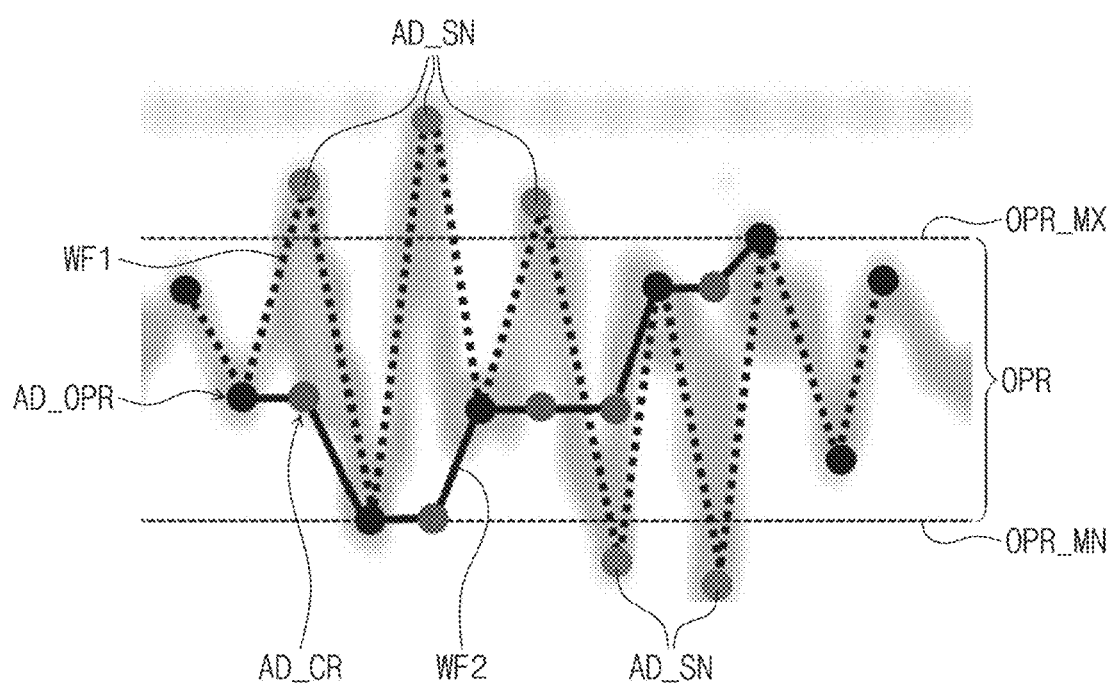

FIG. 10 is a flowchart illustrating an embodiment of a method for calculating a correction value according to the disclosure. FIGS. 11A and 11B are waveform pictures illustrating an embodiment of an output range and a correction value according to the disclosure.

An embodiment of the disclosure may reset an amplifier AMP as described with reference to FIG. 9 to be stable in waveform of the amplifier AMP and may initiate sampling of analog-to-digital conversion. However, when noise is mixed in the sampling process, a value greatly different from a sampling result value upon normal sampling may be output. A description will be given of a method for reducing such mixing of noise with reference to FIG. 10.

The calculation of the sampling result value in the disclosure is possible when an analog-to-digital conversion value (or a sampling value) of a predetermined pulse is accumulated several times, when the analog-to-digital conversion value (or the sampling value) of the predetermined pulse is maintained in one pulse, or in both the methods. In an embodiment, in the automatic correction method in FIG. 10, a correction value may be calculated using a sampling result value in one pulse.

The sampling result value may be transmitted to a processor MCU (refer to FIG. 6) every predetermined period. The processor MCU may calculate an output range and a correction value of a sampling result value based on the sampling result value received upon automatic correction. In an embodiment, the processor MCU may determine the output range based on a maximum value, a minimum value, and average values of the sampling result values based on statistical information, for example. In other words, the processor MCU may set a maximum output range between the maximum value and the average value and may set a minimum output range between the minimum value and the average value. Herein, the maximum output range may refer to an upper limit of the output range, and the minimum output range may refer to a lower limit of the output range.

In an embodiment, the output range may be set based on a mode of the sampling result values. The mode may refer to the most output value among the sampling result values.

The output range of the sampling result value may be delivered to the processor MCU which accumulates the sampling result value. In an embodiment, the description is given of the case where the processor MCU which calculates and accumulates the output range and the correction value using the sampling result value is disposed in a sensor driver T-IC. However, the processor MCU may be disposed in a main driver EDC.

In FIG. 10, in operation S110, the processor MCU may receive a new sampling result value from each of a plurality of sensing electrodes. The sampling result value may be determined in one pulse.

In operation S120, the processor MCU may set an output range by the sampling result value. The output range may be calculated based on a maximum value, a minimum value, and an average value of sampling result values. The maximum value, the minimum value, and the average value of the sampling result values may be determined by the sampling result values accumulated in the processor MCU. In an embodiment, a time when the maximum value, the minimum value, and the average value are updated may be determined by the sensor driver T-IC or the main driver EDC.

When the received sampling result value deviates from the output range, in operation S130, the processor MCU may determine and exclude it as unexpected noise. In operation S132, the processor MCU may use a sampling value received in the past (or previously) as a correction value.

In operation S140, the processor MCU may accumulate a sampling result value of one cycle including one pulse including the correction value and may determine a new output range based on the accumulated sampling result value. Thereafter, the processor MCU may receive a new sampling result value in another pulse using the new output range and may calculate a correction value. In an electronic device according to the disclosure, automatic correction may be performed using the method shown in FIG. 10.

FIG. 11A illustrates a waveform of a sampling result value of one pulse. FIG. 11A illustrates an embodiment of setting an output range.

In FIG. 11A, an output range OPR may correspond to a range between a maximum output range OPR_MX and a minimum output range OPR_MN. Herein, the maximum output range OPR_MX may refer to an upper limit of an output range, and the minimum output range OPR_MN may refer to a lower limit of the output range. The output range OPR may be determined by a maximum value AD_MX, the minimum value AD_MN, and an average value AD_AV of a sampling result value. In an embodiment, the maximum output range OPR_MX may be determined between the maximum value AD_MX and the average value AD_AV of the sampling result value, for example. The minimum output range OPR_MN may be determined between the minimum value AD_MN and the average value AD_AV of the sampling result value.

A width Y1 between the average value AD_AV and the maximum output range OPR_MX may be proportional to a width X1 between the maximum output range OPR_MX and the maximum value AD_MX. A width Y2 between the average value AD_AV and the minimum output range OPR_MN may be proportional to a width X2 between the minimum output range OPR_MN and the minimum value AD_MN.

FIG. 11B illustrates an embodiment of a waveform of a sampling result value including a correction value. FIG. 11B enlarges and illustrates a portion of a waveform of FIG. 11A.

FIG. 11B illustrates a waveform WF1 before correction and a waveform WF2 after correction, including a sampling result value. In FIG. 11B, the waveform WF1 before correction may include a sampling result value AD_OPR in an output range and a sampling result value AD_SN determined as unexpected noise. It may be seen that the sampling result value AD_SN determined as noise in the waveform WF1 before correction deviates from an output range OPR.

The waveform WF2 after correction may include the sampling result value AD_OPR in the output range and a correction value AD_CR corrected to a previous sampling result value. The correction value AD_CR may be calculated for the sampling result value AD_SN determined as noise in the waveform WF1 before correction. It may be seen that the correction value AD_CR is determined as the same value as the sampling result value AD_OPR in the immediately previously output range.

Figure 12:
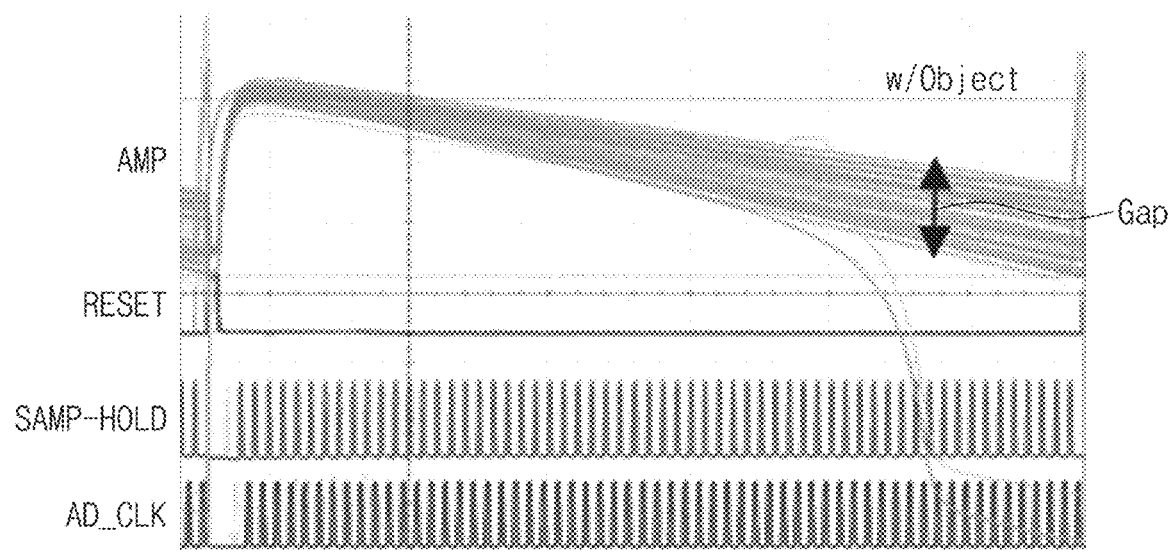
FIG. 12 is a picture illustrating an embodiment of a driving waveform according to the disclosure.
Figure 13:
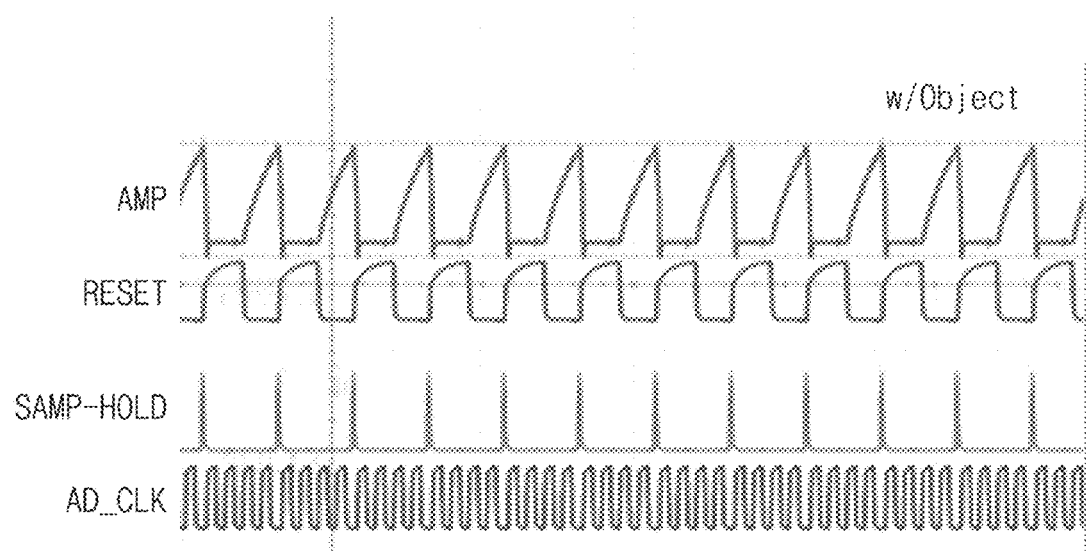
FIG. 13 is a picture illustrating a comparison example of a driving waveform.

FIG. 12 is a picture illustrating an embodiment of a driving waveform according to the disclosure. FIG. 13 is a picture illustrating a comparison example a driving waveform. A description will be given by comparing FIG. 12 with FIG. 13.

When there is an object corresponding to an external input (e.g., a user finger or a pen) adjacent to an input sensor IS (refer to FIG. 5A), e.g., in case of hovering, the input sensor IS may receive a fine input signal. In this case, according to a comparison embodiment of FIG. 13, because a change in the amplifier AMP is minute although there is an object, it is difficult to visually identify the change. In a driving waveform in an embodiment of the disclosure in FIG. 12, when an object is adjacent, a change in the amplifier AMP indicates a gap large enough to be visually identified. Thus, in an embodiment of the disclosure, it is substantially easy to reduce noise and detect a location according to a fine signal of the object.

Figure 14A:
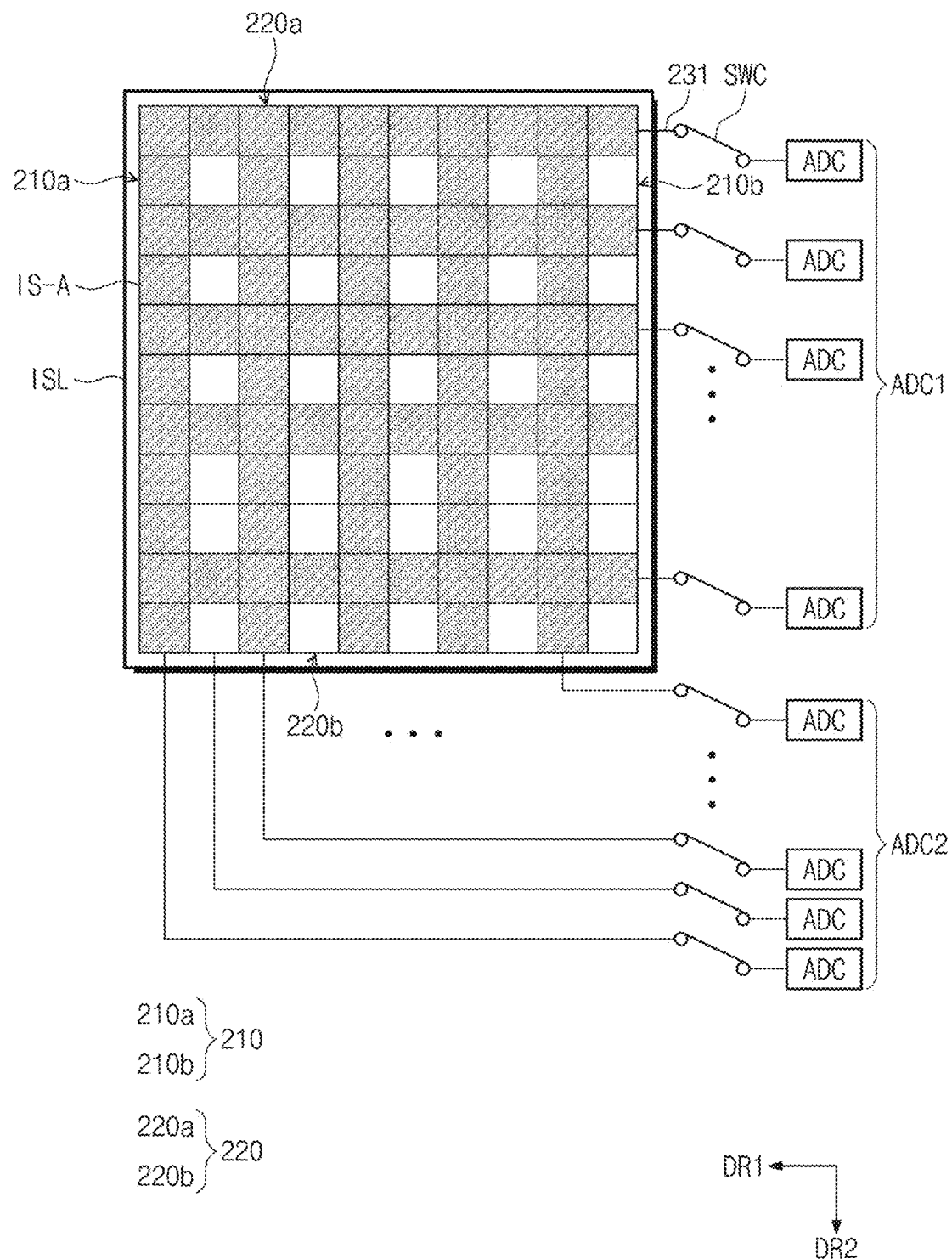
FIGS. 14A, 14B, and 14C are drawings illustrating an embodiment of a sensor layer and a plurality of analog-to-digital converters according to the disclosure.
Figure 14B:
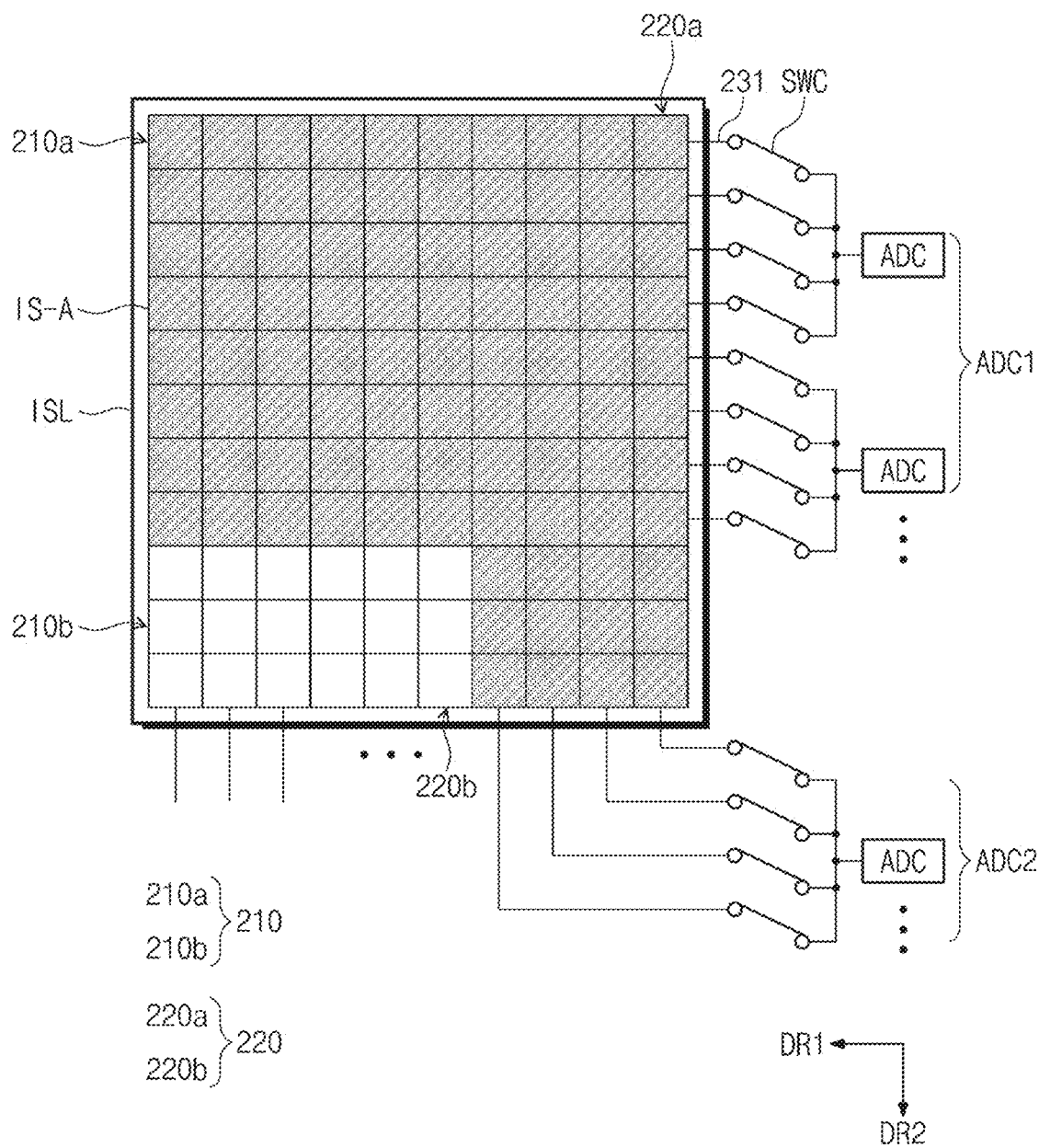
Figure 14C:
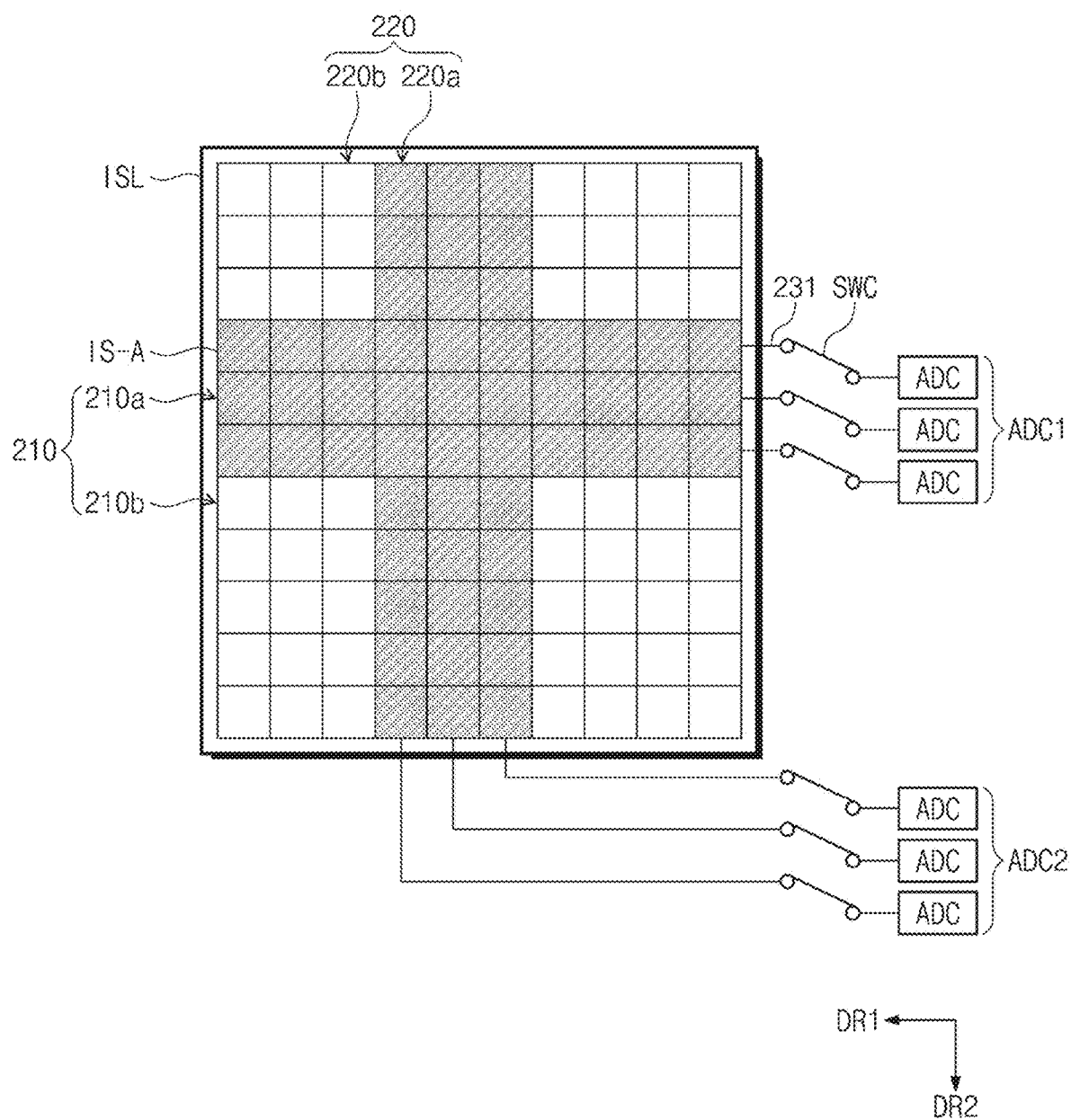

FIGS. 14A to 14C are drawings illustrating an embodiment of a sensor layer and a plurality of analog-to-digital converters according to the disclosure.

In FIG. 14A, a plurality of sensing electrodes 200 may be divided into a sensing electrode which is connected with an analog-to-digital converter ADC and a sensing electrode which is not connected with the analog-to-digital converter ADC. In an embodiment, first sensing electrodes 210 may include a first sensing electrode 210a which is connected with the analog-to-digital converter ADC and a first sensing electrode 210b which is not connected with the analog-to-digital converter ADC. Second sensing electrodes 220 may include a second sensing electrode 220a which is connected with the analog-to-digital converter ADC and a second sensing electrode 220b which is not connected with the analog-to-digital converter ADC.

The first sensing electrodes 210a which are connected with the analog-to-digital converters ADC arranged in a second direction DR2 and the first sensing electrodes 210b which are not connected with the analog-to-digital converters ADC may be alternately arranged. The second sensing electrodes 220a which are connected with the analog-to-digital converters ADC arranged in a first direction DR1 and the second sensing electrodes 220b which are not connected with the analog-to-digital converters ADC may be alternately arranged. In other words, in an embodiment, the analog-to-digital converters ADC may not be connected with all the sensing electrodes 200, and the analog-to-digital converters ADC may be less in number than the sensing electrodes 200.

When it is unnecessary to specify a detailed location of the input signal and when it wants to identify only an approximate location, all the sensing electrodes 200 do not need to be connected with analog-to-digital converters ADC. In other words, in an embodiment, the sensing electrodes 210a and 220a connected with the analog-to-digital converters ADC may be spaced apart from each other at a predetermined interval. In an embodiment, the sensing electrodes 210b and 220b which are not connected with at least one analog-to-digital converter ADC may be arranged between the analog-to-digital converter ADC and the sensing electrodes 210a and 220a, in a plan view, for example.

In FIG. 14B, the plurality of sensing electrodes 200 may be connected with one analog-to-digital converter ADC. Some sensing electrodes adjacent to each other among the plurality of sensing electrodes 200 may form a sensing electrode group. The sensing electrode group may be connected with one analog-to-digital converter ADC.

In an embodiment, some first sensing electrodes 210a adjacent to each other among the first sensing electrodes 210 may form a plurality of first sensing electrode groups, respectively. Each of the plurality of first sensing electrode groups may be connected with one first analog-to-digital converter ADC1. Some second sensing electrodes 220a adjacent to each other among the second sensing electrodes 220 may form a plurality of second sensing electrode groups, respectively. Each of the plurality of second sensing electrode groups may be connected with one second analog-to-digital converter ADC2.

It is shown in FIG. 14B that four sensing electrodes adjacent to each other are connected with one analog-to-digital converter ADC. However, this is only an example, but not limited thereto. The plurality of sensing electrode groups may be sampled at the same time by analog-to-digital converters ADC respectively connected with the plurality of sensing electrode groups. A sensor layer ISL in an embodiment may include a plurality of sensing electrode groups including a plurality of sensing electrode to physically increase an area of sensing lines 230 and increase receive sensitivity of a fine signal.

In FIG. 14C, the plurality of analog-to-digital converters ADC may be connected one-to-one with some sensing electrodes to which the input signal is applied among the plurality of sensing electrodes 200. In an embodiment, in FIG. 14C, three first sensing electrodes 210a adjacent to each other and three second sensing electrodes 220a adjacent to each other may correspond to sensing electrodes to which the input signal is applied, for example. The first sensing electrodes 210a and the second sensing electrodes 220a may be connected one-to-one with analog-to-digital converters ADC1 and ADC2, respectively. The analog-to-digital converters ADC may not be connected with the sensing electrodes 210b and 220b to which the input signal is not applied.

The electronic device in an embodiment of the disclosure may simultaneously connect sensing electrodes of an input sensor with a plurality of analog-to-digital converters to sufficiently ensure a sampling time and increase an input signal, thus improving sensor performance.

As described above, embodiments are disclosed in drawings and specifications. Specific terms are used herein, but are only used for the purpose of describing the disclosure, and are not used to limit the meaning or the scope of the disclosure described in claims. Therefore, it will be understood that various modifications and other equivalent embodiments are possible from this point by those skilled in the art. The technical protection scope of the disclosure will be defined by the technical spirit of the appended claims.

What is claimed is:

1. An electronic device, comprising:
a display panel;
a sensor layer disposed on the display panel and including a plurality of sensing electrodes; and
a sensor driver which is connected with the plurality of sensing electrodes and drives the sensor layer, the sensor driver including:
a plurality of analog-to-digital converters which sample an input signal received from an outside by the sensor layer,
wherein the plurality of analog-to-digital converters is connected one-to-one with the plurality of sensing electrodes,
wherein the plurality of sensing electrodes is sampled at a same time by the plurality of analog-to-digital converters respectively connected with the plurality of sensing electrodes, and
wherein sensing electrodes which are connected with the plurality of analog-to-digital converters among the plurality of sensing electrodes and sensing electrodes which are not connected with the plurality of analog-to-digital converters among the plurality of sensing electrodes are alternately arranged.

2. The electronic device of claim 1, wherein a number of the plurality of sensing electrodes is equal to a number of the plurality of analog-to-digital converters.

3. The electronic device of claim 2, further comprising:
a plurality of switches respectively connected between the plurality of sensing electrodes and the plurality of analog-to-digital converters,
wherein the plurality of sensing electrodes is selectively electrically connected with the plurality of analog-to-digital converters through the plurality of switches.

4. The electronic device of claim 1, wherein the plurality of sensing electrodes includes a plurality of first sensing electrodes extending in a first direction and a plurality of second sensing electrodes extending in a second direction crossing the first direction.

5. The electronic device of claim 4, wherein the plurality of analog-to-digital converters includes a plurality of first analog-to-digital converters respectively connected with the plurality of first sensing electrodes and a plurality of second analog-to-digital converters respectively connected with the plurality of second sensing electrodes.

6. The electronic device of claim 5, wherein a number of the plurality of first analog-to-digital converters is equal to a number of the plurality of first sensing electrodes, and
Wherein a number of the plurality of second analog-to-digital converters is equal to a number of the plurality of second sensing electrodes.

7. The electronic device of claim 1, wherein the plurality of analog-to-digital converters is connected one-to-one with some sensing electrodes to which the input signal is applied among the plurality of sensing electrodes.

8. The electronic device of claim 1, further comprising:
a processor which receives a plurality of sampling result values from the sensor driver,
wherein the processor calculates an output range of the plurality of sampling result values and a correction value based on the plurality of sampling result values.

9. The electronic device of claim 8, wherein the processor accumulates received sampling result values to calculate the output range and determines a predetermined sampling result value deviating from the output range among accumulated sampling result values as noise.

10. The electronic device of claim 9, wherein the processor replaces the predetermined sampling result value determined as the noise with an immediately previous sampling result value to calculate the correction value.

11. The electronic device of claim 10, wherein the output range is determined based on a maximum value and a minimum value of the plurality of sampling result values or an average value or a mode of the plurality of sampling result values.

12. The electronic device of claim 8, further comprising:
a main driver connected with the sensor driver,
wherein the processor is disposed in any one of the sensor driver or the main driver.

13. An electronic device, comprising:
a display panel;
a sensor layer disposed on the display panel and including a plurality of sensing electrodes; and
a sensor driver which is connected with the plurality of sensing electrodes and drives the sensor layer, the sensor driver includes:
a plurality of analog-to-digital converters which sample an input signal received from an outside by the sensor layer,
wherein one of the plurality of analog-to-digital converters is electrically connected with a sensing electrode group including some sensing electrodes adjacent to each other among the plurality of sensing electrodes,
wherein the sensing electrode group is plural in number,
wherein a plurality of sensing electrode groups is sampled at a same time by analog-to-digital converters respectively connected with the plurality of sensing electrode groups, and
wherein sensing electrodes which are connected with the plurality of analog-to-digital converters among the plurality of sensing electrodes and sensing electrodes which are not connected with the plurality of analog-to-digital converters among the plurality of sensing electrodes are alternately arranged.

14. An electronic device, comprising:
a display panel;
a sensor layer disposed on the display panel and including a plurality of sensing electrodes extending in a first direction and arranged in a second direction crossing the first direction; and
a sensor driver which is electrically connected with the plurality of sensing electrodes and drives the sensor layer, the sensor driver including:
a plurality of analog-to-digital converters which are connected one-to-one with the plurality of sensing electrodes and sample an input signal received in the plurality of sensing electrodes from an outside at a same time,
wherein a number of the plurality of sensing electrodes is equal to a number of the plurality of analog-to-digital converters, and
wherein sensing electrodes which are connected with the plurality of analog-to-digital converters among the plurality of sensing electrodes and sensing electrodes which are not connected with the plurality of analog-to-digital converters among the plurality of sensing electrodes are alternately arranged.

15. The electronic device of claim 14, wherein the sensor driver further includes a processor which receives a plurality of sampling result values, and
wherein the processor calculates an output range based on the plurality of sampling result values and calculates a correction value for predetermined sampling result values deviating from the output range.

16. The electronic device of claim 15, wherein the correction value corresponds to a sampling result value received immediately before each of the predetermined sampling result values.

17. The electronic device of claim 15, wherein the output range is determined based on a maximum value and a minimum value of the plurality of sampling result values or an average value or a mode of the plurality of sampling result values.

* * * * *